United States Patent
Lee

(10) Patent No.: US 10,578,934 B2
(45) Date of Patent: Mar. 3, 2020

(54) COLOR SEQUENTIAL DISPLAY DEVICE AND DISPLAY METHOD THEREOF

(71) Applicant: a.u. Vista, Inc., Irvine, CA (US)

(72) Inventor: Seok-Lyul Lee, Hsin-chu (TW)

(73) Assignee: A.U. VISTA, INC., Irvine, CA (US)

(*) Notice: Subject to any disclaimer, the term of this patent is extended or adjusted under 35 U.S.C. 154(b) by 0 days.

(21) Appl. No.: 15/964,756

(22) Filed: Apr. 27, 2018

(65) Prior Publication Data
US 2019/0331955 A1    Oct. 31, 2019

(51) Int. Cl.
| G02F 1/1334 | (2006.01) |
| G02F 1/1347 | (2006.01) |
| G02F 1/1335 | (2006.01) |
| G02F 1/1343 | (2006.01) |
| G02F 1/133 | (2006.01) |

(52) U.S. Cl.
CPC ........ *G02F 1/13476* (2013.01); *G02F 1/1334* (2013.01); *G02F 1/13306* (2013.01); *G02F 1/13439* (2013.01); *G02F 1/133504* (2013.01); *G02F 1/133514* (2013.01); *G02F 1/133617* (2013.01); *G02F 1/134309* (2013.01); *G02F 1/133553* (2013.01); *G02F 2001/13345* (2013.01); *G02F 2201/121* (2013.01); *G02F 2201/123* (2013.01)

(58) Field of Classification Search
CPC .................................................. G02F 1/13476
See application file for complete search history.

(56) References Cited

U.S. PATENT DOCUMENTS

| 8,698,980 | B2 | 4/2014 | Chao et al. | |
| 2005/0206814 | A1* | 9/2005 | Histake | G02F 1/1323 349/112 |
| 2008/0225194 | A1* | 9/2008 | Harada | G02F 1/136227 349/46 |
| 2009/0147186 | A1* | 6/2009 | Nakai | G02F 1/13471 349/74 |
| 2013/0120678 | A1* | 5/2013 | Chao | G02F 1/01 349/34 |

(Continued)

FOREIGN PATENT DOCUMENTS

| CN | 106526975 A | 3/2017 |
| TW | 201621423 A | 6/2016 |

*Primary Examiner* — Sang V Nguyen
(74) *Attorney, Agent, or Firm* — Locke Lord LLP; Tim Tingkang Xia, Esq.

(57) ABSTRACT

A display cell structure includes a first structure and a second structure disposed on the first structure. In the first structure, a liquid crystal layer is disposed between a first substrate and a second substrate, defining multiple pixels. A color filter layer is disposed on the first substrate. In each pixel, the color filter layer includes a blue (B) color filter in a first sub-pixel and a yellow (Y) color filter in a second sub-pixel. In the second structure, a polymer networked liquid crystal (PNLC) or polymer dispersed liquid crystal (PDLC) layer is disposed between a third substrate and a fourth substrate. Multiple first and second transparent electrodes are correspondingly disposed on the third and fourth substrates. A quantum material layer is disposed between the third substrate and the first transparent electrodes. The quantum material layer includes a red quantum material (R-quantum material) and a green quantum material (G-quantum material).

19 Claims, 17 Drawing Sheets

(56) References Cited

U.S. PATENT DOCUMENTS

| | | | |
|---|---|---|---|
| 2014/0320782 A1* | 10/2014 | Uhm | G02F 1/155 349/62 |
| 2015/0002788 A1* | 1/2015 | Guo | G02F 1/133603 349/69 |
| 2015/0145405 A1* | 5/2015 | Yang | H01L 27/3211 313/498 |
| 2015/0346564 A1* | 12/2015 | Moriwaki | G02F 1/134309 349/43 |
| 2017/0220185 A1* | 8/2017 | Kurasawa | G02F 1/13306 |
| 2019/0121205 A1* | 4/2019 | Lazo Martinez | G02F 1/134309 |

* cited by examiner

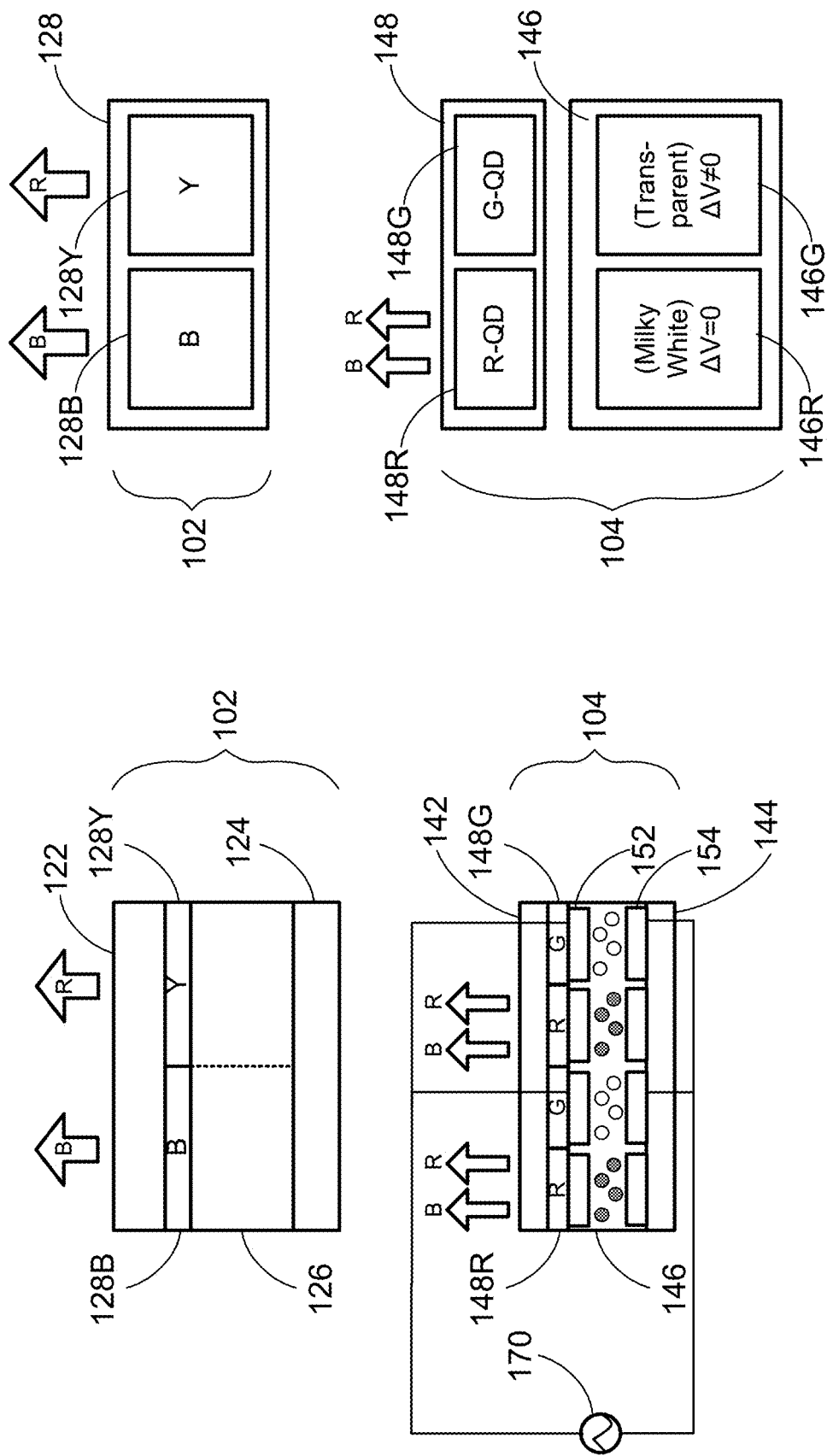

COLOR SEQUENTIAL DISPLAY DEVICE AND DISPLAY METHOD THEREOF

FIELD

The disclosure relates generally to display technology, and more particularly to a color sequential display device and a display method thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A liquid crystal display (LCD) is a non-emissive display which is commonly used as a display device because of its capability of displaying images with good quality while using little power. The LCD utilizes a separate backlight unit to emit light, and color filters such as red (R), green (G) and blue (B) color filters may be used for pixels to display a color image on a screen. Currently, however, the optical efficiency of the LCD stacks may be about 3% to 5%, which may not be satisfactory to achieve a high brightness and/or high contrast LCD.

Therefore, a heretofore unaddressed need exists in the art to address the aforementioned deficiencies and inadequacies.

SUMMARY

One aspect of the disclosure relates to a display cell structure, which includes a first structure and a second structure, where the first structure is disposed on the second structure. The first structure includes: a first substrate and a second substrate spaced apart from each other; a liquid crystal layer disposed between the first substrate and the second substrate, the liquid crystal layer defining a plurality of pixels, and each of the plurality of pixels defining a first sub-pixel and a second sub-pixel; and a color filter layer disposed on the first substrate facing the liquid crystal layer, wherein in each pixel, the color filter layer includes a blue (B) color filter in the first sub-pixel and a yellow (Y) color filter in the second sub-pixel. The second structure includes: a third substrate and a fourth substrate spaced apart from each other, wherein the third substrate is located closer to the second substrate of the first structure than the fourth substrate; a polymer networked liquid crystal (PNLC) or polymer dispersed liquid crystal (PDLC) layer disposed between the third substrate and the fourth substrate; at least one first transparent electrode disposed on the third substrate and facing the PNLC or PDLC layer; at least one second transparent electrode correspondingly disposed on the fourth substrate and facing the PNLC or PDLC layer; a quantum material layer disposed between the third substrate and the at least one first transparent electrode, wherein the quantum material layer includes a red quantum material (R-quantum material) and a green quantum material (G-quantum material); and a blue light source emitting a blue light toward the PNLC or PDLC layer.

In certain embodiments, the display cell structure further includes a diffusion film disposed between the first structure and the second structure.

In certain embodiments, the second structure further includes a reflection sheet disposed on the fourth substrate and facing an opposite side to the PNLC or PDLC layer.

In certain embodiments, the first structure further includes a first polarizer disposed on the first substrate facing an opposite side of the liquid crystal layer; and a second polarizer disposed on the second substrate facing an opposite side of the liquid crystal layer.

In certain embodiments, a ratio of a width of each G-quantum material and each R-quantum material to a width of each of the blue (B) color filter and each of the yellow (Y) color filter is in a range of 1:1 to 3:1.

In certain embodiments, for each of the pixels, in a first half-frame, the first transparent electrode and the second transparent electrode corresponding to each G-quantum material are provided with a voltage difference to form an electric field to control alignment of PNLC or PDLC molecules of the PNLC or PDLC layer, and the first transparent electrode and the second transparent electrode corresponding to each R-quantum material are not provided with the voltage difference, such that the PNLC or PDLC molecules aligned to the G-quantum material are configured to be turned on to switch to a transparent state, and the PNLC or PDLC molecules aligned to the R-quantum material are randomly arranged to scatter and diffuse the blue light emitted by the blue light source, such that the blue light is guided toward the R-quantum material; and in a second half-frame, the first transparent electrode and the second transparent electrode corresponding to each R-quantum material are provided with the voltage difference to form the electric field to control alignment of PNLC or PDLC molecules of the PNLC or PDLC layer, and the first transparent electrode and the second transparent electrode corresponding to each G-quantum material are not provided with the voltage difference, such that the PNLC or PDLC molecules aligned to the R-quantum material are configured to be turned on to switch to the transparent state, and the PNLC or PDLC molecules aligned to the G-quantum material are randomly arranged to scatter and diffuse the blue light emitted by the blue light source, such that the blue light is guided toward the G-quantum material.

In certain embodiments, for each of the pixels, in the first half-frame, when the R-quantum material receives the blue light guided by the PNLC or PDLC molecules aligned to the R-quantum material, the R-quantum material is excited by the blue light to emit the blue light and a red light toward the first structure; and in the second half-frame, when the G-quantum material receives the blue light guided by the PNLC or PDLC molecules aligned to the G-quantum material, the G-quantum material is excited by the blue light to emit the blue light and a green light toward the first structure.

In certain embodiments, for each of the pixels, in the first half-frame, when the blue (B) color filter in the first sub-pixel receives the blue light and the red light emitted by the R-quantum material, the blue light propagates the blue (B) color filter; in the first half-frame, when the yellow (Y) color filter in the second sub-pixel receives the blue light and the red light emitted by the R-quantum material, the red light propagates the yellow (Y) color filter; in the second half-frame, when the blue (B) color filter in the first sub-pixel receives the blue light and the green light emitted by the G-quantum material, the blue light propagates the blue (B) color filter; and in the second half-frame, when the yellow (Y) color filter in the second sub-pixel receives the blue light and the green light emitted by the G-quantum material, the green light propagates the yellow (Y) color filter.

In certain embodiments, an optical efficiency of each of the blue light, the red light and the green light is about 45%.

In certain embodiments, the display cell structure has a frame frequency of 120 Hz.

In certain embodiments, the at least one first transparent electrode includes a plurality of first strip-shaped electrodes, and the at least one second transparent electrodes correspondingly includes a plurality of second strip-shaped electrodes, each of the first strip-shaped electrodes and each of the second strip-shaped electrodes extend along an extending direction, and the extending direction is a column direction or a row direction.

In certain embodiments, each of the second strip-shaped electrodes has an identical width.

In certain embodiments, the second strip-shaped electrodes have different widths, and a first width of one of the second strip-shaped electrodes located farther away from the blue light source is greater than a second width of another one the second strip-shaped electrodes located closer to the blue light source.

In certain embodiments, one of the at least one first transparent electrode and the at least one second transparent electrode includes a plurality of strip-shaped electrodes extending along an extending direction, the extending direction is a column direction or a row direction, and the other of the at least one first transparent electrode and the at least one second transparent electrode includes a common electrode.

In certain embodiments, the G-quantum materials and the R-quantum materials of the pixels are alternately disposed along a first direction such that each G-quantum material is adjacent to one of the R-quantum materials in the first direction, and the first direction is a row direction or a column direction.

In certain embodiments, the G-quantum materials and the R-quantum materials of the pixels are alternately disposed along a row direction and a column direction to form a matrix, such that each G-quantum material is adjacent to one of the R-quantum materials in the row direction and in the column direction.

In certain embodiments, each of the first strip-shaped electrodes and the second strip-shaped electrodes has two long sides, and the blue light source is disposed at a side of the second structure parallel to the long sides of each of the first strip-shaped electrodes.

In certain embodiments, the blue light source comprises a first blue light source and a second blue light source, respectively disposed at two opposite sides of the second structure parallel to the two long sides of each of the first strip-shaped electrodes.

In another aspect of the disclosure, a display method includes: providing a display cell structure as described above; in a first half-frame, providing a voltage difference to the first transparent electrode and the second transparent electrode corresponding to each G-quantum material to form an electric field to control alignment of PNLC or PDLC molecules of the PNLC or PDLC layer corresponding to each G-quantum material, and providing no voltage difference to the first transparent electrode and the second transparent electrode corresponding to each R-quantum material, such that the PNLC or PDLC molecules aligned to the G-quantum material are configured to be turned on to switch to a transparent state, and the PNLC or PDLC molecules aligned to the R-quantum material are randomly arranged to scatter and diffuse the blue light emitted by the blue light source, such that the blue light is guided toward the R-quantum material; and in a second half-frame, providing the voltage difference to the first transparent electrode and the second transparent electrode corresponding to each R-quantum material to form an electric field to control alignment of the PNLC or PDLC molecules of the PNLC or PDLC layer corresponding to each R-quantum material, and providing no voltage difference to the first transparent electrode and the second transparent electrode corresponding to each G-quantum material, such that the PNLC or PDLC molecules aligned to the R-quantum material are configured to be turned on to switch to the transparent state, and the PNLC or PDLC molecules aligned to the G-quantum material are randomly arranged to scatter and diffuse the blue light emitted by the blue light source, such that the blue light is guided toward the G-quantum material.

In certain embodiments, for each of the pixels, in the first half-frame, when the R-quantum material receives the blue light guided by the PNLC or PDLC molecules aligned to the R-quantum material, the R-quantum material is excited by the blue light to emit the blue light and a red light toward the first structure; and in the second half-frame, when the G-quantum material receives the blue light guided by the PNLC or PDLC molecules aligned to the G-quantum material, the G-quantum material is excited by the blue light to emit the blue light and a green light toward the first structure.

In certain embodiments, the method further includes: for each of the pixels, controlling alignment of liquid crystal molecules of the liquid crystal layer, such that the blue light and the red light emitted by the R-QD in the first half-frame and the blue light and the green light emitted by the G-QD in the second half-frame is allowed to pass through at least some of the pixels.

In certain embodiments, for each of the pixels, in the first half-frame, when the blue (B) color filter in the first sub-pixel receives the blue light and the red light emitted by the R-quantum material, the blue light propagates the blue (B) color filter; in the first half-frame, when the yellow (Y) color filter in the second sub-pixel receives the blue light and the red light emitted by the R-quantum material, the red light propagates the yellow (Y) color filter; in the second half-frame, when the blue (B) color filter in the first sub-pixel receives the blue light and the green light emitted by the G-quantum material, the blue light propagates the blue (B) color filter; and in the second half-frame, when the yellow (Y) color filter in the second sub-pixel receives the blue light and the green light emitted by the G-quantum material, the green light propagates the yellow (Y) color filter.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 3A schematically shows an operation of a display cell structure in a first half-frame according to certain embodiments of the present disclosure.

FIG. 3C schematically shows the states of the color filters, the QD's and the PDLC layer of the display cell structure in the first half-frame as shown in FIG. 3A.

DETAILED DESCRIPTION OF THE DISCLOSURE

Figure 1:
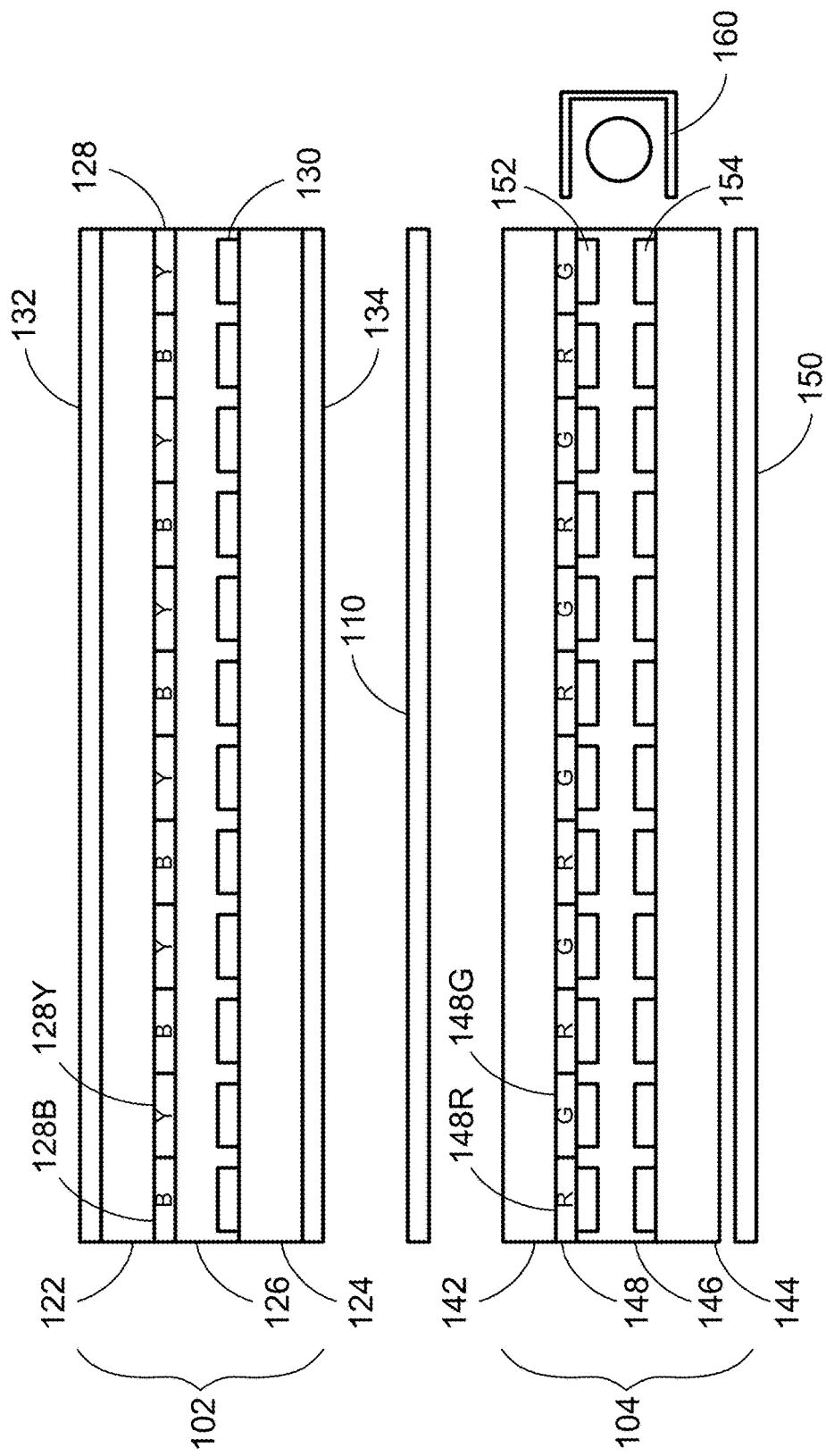
FIG. 1 schematically shows a cross-sectional view of a display cell structure of a display device according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a color sequential display device and display method thereof.

As described above, currently, the optical efficiency of the LCD stack is relatively low. Specifically, in a typical LCD stack, when the light emitted by the light source is guided by the light guide plate toward a diffusion film, the optical efficiency may be reduced to about 90%. The diffused light may then passes a polarizer, the thin-film transistor (TFT) layer and the color filters, which further sequentially reduces the optical efficiency to 36%, 18%, and then 5%. Thus, the total optical efficiency of the LCD stack is about 3-5%, which may not be satisfactory to achieve a high brightness and/or high contrast LCD. Certain aspects of the disclosure relates to a color sequential display, which may improve transmittance and reduce production cost.

In some cases, in order to improve the saturation (higher color gamut), the use of quantum dot (QD) matrix was implemented. The QD may be an excellent energy down-conversion material with high quantum efficiency and narrow emission bandwidth. Specifically, the QD molecules are absorbing light with shorter wavelength (e.g. deep blue 450 nm) and emits, after conversion, light with a longer wavelength. Depending on the molecular physical size, the emission may be green (e.g. 550 nm) or red (e.g. 640 nm). The narrow spectra together with high quantum efficiency make the QD an attractive solution. QD materials like nano spheres (e.g. Cadmium) coated with a shell had be used, and other materials like Perovskites or phosphorous materials are also being developed. Due to these unique features, the QD has been widely used in LCD backlight to enhance the color performance. Currently, there are two types of structures widely used in LCD backlight system. One is a QD film type on light guide plate, which is widely used in the LCD backlight system to provide high efficiency and good stability. Another type is a QD bar, which is generally disposed in front of a blue LED. The QD bar is a cost effective structure, but may result in a short life time of QD due to the LED thermal stress.

However, merely using the QD does not enhance the optical efficiency of the display device to a desired value.

In certain embodiments, a display cell structure, which utilizes two structures to perform a color sequential display, so as to improve transmittance of the light and reduce the manufacturing costs.

Figure 2:
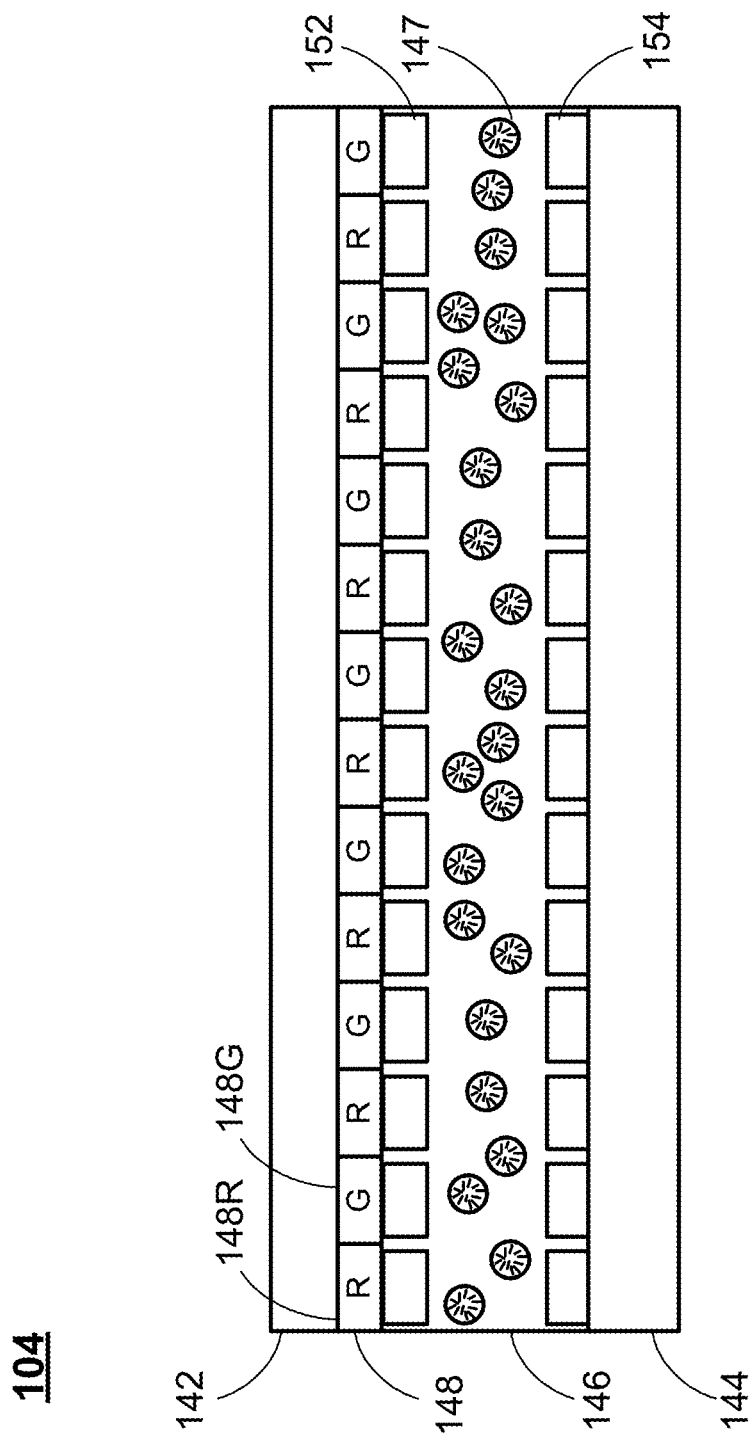
FIG. 2 schematically shows a partially enlarged cross-sectional view of the second structure of the display cell structure as shown in FIG. 1.

FIG. 1 schematically shows a cross-sectional view of a display cell structure of a display device according to certain embodiments of the present disclosure, and FIG. 2 schematically shows a partially enlarged cross-sectional view of the second structure of the display cell structure as shown in FIG. 1. As shown in FIG. 1, the display cell structure 100 includes a first structure 102, a second structure 104, and a diffusion film 110 disposed between the first structure 102 and the second structure 104. The first structure 102 is a top structure which functions as a display structure, and the second structure 104 is a bottom structure which functions as a shutter structure.

As shown in FIG. 1, the first structure 102 includes a first substrate 122 and a second substrate 124 spaced apart from each other, a liquid crystal layer 126 disposed between the first substrate 122 and the second substrate 124, a color filter layer 128, a plurality of thin-film transistors (TFTs), a first polarizer 132 and a second polarizer 134. The first substrate 122 is located on the top of the second substrate 124. In other words, the second substrate 124 is located closer to the second structure 104 than the first substrate 122. The liquid crystal layer defines a plurality of pixels, and each pixel defines two sub-pixels, namely a first sub-pixel and a second sub-pixel. The color filter layer 128 is disposed on the first substrate 122 facing the liquid crystal layer 126. Specifically, the color filter layer 128 includes a plurality of color filters, and each color filter corresponds to one of the sub-pixel and has a substantially identical width. In other words, each pixel (which defines two sub-pixels) corresponds to two color filters. In particular, in each pixel, the two corresponding color filters include a blue (B) color filter 128B in the first sub-pixel and a yellow (Y) color filter 128Y in the second sub-pixel. The TFTs 130 is disposed on the second substrate 124 facing the liquid crystal layer 126, and each TFT 130 corresponds to one sub-pixel to control alignment of liquid crystal molecules of the liquid crystal layer 126 in the corresponding sub-pixel. The first polarizer 132 and the second polarizer 134 are respectively disposed on the outer sides of the first substrate 122 and the second substrate 124. In other words, the first polarizer 132 is disposed on the first substrate 122 facing an opposite side of the liquid crystal layer 126, and the second polarizer 134 is disposed on the second substrate 122 facing an opposite side of the liquid crystal layer 126.

Further, as shown in FIGS. 1 and 2, the second structure 104 includes a third substrate 142 and a fourth substrate 144 spaced apart from each other, a polymer networked liquid crystal (PNLC) or polymer dispersed liquid crystal (PDLC) layer 146 disposed between the third substrate 142 and the fourth substrate 144, a plurality of quantum dot (QD) layer 148, a reflection sheet 150, a plurality of first transparent electrodes 152, a plurality of second transparent electrodes 154, and a blue light source 160. The third substrate 142 is located on the top of the fourth substrate 144. In other words, the third substrate 142 is located closer to the first structure 102 than the fourth substrate 144. The first transparent electrodes 152 and the second transparent electrodes 154 are respectively disposed on the third substrate 142 and the second substrate 144, and facing the PNLC or PDLC layer 146. As shown in FIG. 1, the first transparent electrodes 152 and the second transparent electrodes 154 are one-to-one corresponding to each other. The QD layer 148 is a quantum material layer, which is disposed between the third substrate 142 and the first transparent electrodes 152. Specifically, the QD layer 148 includes a plurality of QD's, and each QD corresponds to one of the first transparent electrodes 152. In particular, as shown in FIG. 1, the QD's of the QD layer 148 includes a plurality of red QD's (R-QD's) 148R and a plurality of green QD's (G-QD's) 148G alternatively disposed. The reflection sheet 150 is disposed on an outer side of the fourth substrate 144, and facing an opposite side to the PNLC or PDLC layer 146. The blue light source 160 is used to emit a blue light toward the PNLC or PDLC layer 146. As shown in FIG. 1, each G-QD 148G and each R-QD 148R has a substantially identical width, and the width of each G-QD 148G and the width of each R-QD 148R are substantially identical to the width of each color filter. In other words, a ratio of the width of each G-QD 148G and each R-QD 148R to the width of each of the blue (B) color filter 128B and each of the yellow (Y) color filter 128Y is 1:1. In certain embodiments, the QD's can be replaced by quantum rods or other quantum materials with similar properties. In other words, the quantum material used in the quantum material layer may be the QD's, quantum rods, or other quantum materials with similar properties.

As shown in FIG. 2, the PNLC or PDLC layer 146 include PNLC or PDLC molecules 147, which may be dissolved or dispersed into a liquid polymer followed by solidification or curing of the polymer. During the change of the polymer from a liquid to solid, the liquid crystals of the PNLC or PDLC molecules 147 become incompatible with the solid polymer and form droplets throughout the solid polymer. Thus, when a voltage difference is provided by a corresponding set of first transparent electrode 152 and second transparent electrode 154 to form an electric field, the orientation of the PNLC or PDLC molecules 147 of the PNLC or PDLC layer 146 may be controlled by the electric field, such that light is allowed to pass through the corresponding portion of the second structure 104 without scattering. In other words, when a voltage difference is provided by the corresponding first transparent electrode 152 and second transparent electrode 154 to form an electric field, alignment of PNLC or PDLC molecules 147 of the PNLC or PDLC layer 146 can be controlled to switch the corresponding portion of the second structure 104 to the transparent state. On the other hand, when no voltage difference is provided by the corresponding first transparent electrode 152 and second transparent electrode 154, the PNLC or PDLC molecules 147 of the PNLC or PDLC layer 146 are randomly arranged, which results in scattering of light as the light passes through the corresponding portion of the second structure 104. This results in a translucent, "milky white" appearance of the corresponding portion of the second structure 104. In other words, when the corresponding first transparent electrode 152 and second transparent electrode 154 do not provide the voltage difference, the corresponding portion of the second structure 104 is switched to the "substantially opaque state."

Figure 3D:
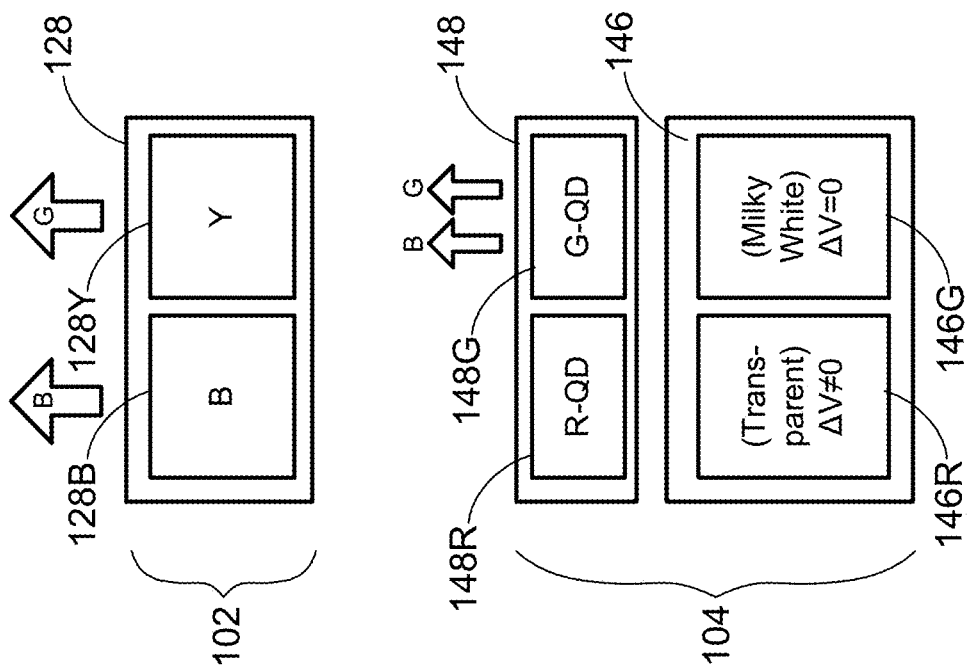
FIG. 3D schematically shows the states of the color filters, the QD's and the PDLC layer of the display cell structure in the second half-frame as shown in FIG. 3B.
Figure 3B:
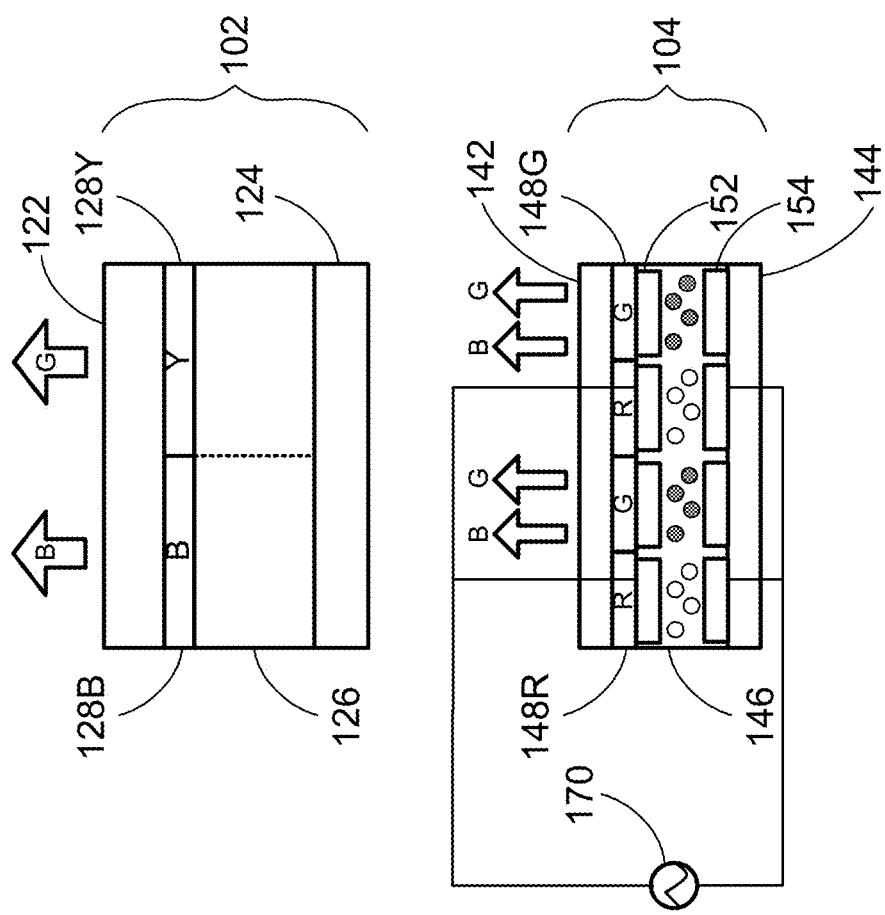
FIG. 3B schematically shows an operation of a display cell structure in a second half-frame according to certain embodiments of the present disclosure.

In certain embodiments, the display cell structure 100 as shown in FIG. 1 may have a frame frequency of 120 Hz. Since each pixel has two sub-pixels, each sub-pixel is configured for a half-frame. In other words, for each pixel, the first sub-pixel is configured for a first half-frame, and the second sub-pixel is configured for a second half-frame. The operation of the display cell structure 100 with the two half-frames may be further described with respects to FIGS. 3A to 3D. Specifically, FIG. 3A schematically shows an operation of a display cell structure in a first half-frame according to certain embodiments of the present disclosure, and FIG. 3B schematically shows an operation of a display cell structure in a second half-frame according to certain embodiments of the present disclosure. FIG. 3C schematically shows the states of the color filters, the QD's and the PDLC layer of the display cell structure in the first half-frame as shown in FIG. 3A, and FIG. 3D schematically shows the states of the color filters, the QD's and the PDLC layer of the display cell structure in the second half-frame as shown in FIG. 3B. It should be noted that the first structure 102 and the second structure 104 as shown in FIGS. 3A to 3D are merely provided for schematic purposes, and the sizes and shapes of the components in the first structure 102 and the second structure 104 as shown in FIGS. 3A to 3D are not intended to limit the scope of the disclosure.

As shown in FIGS. 3A and 3B, in the first structure 102, a pixel is provided, which includes the first sub-pixel where the blue (B) color filter 128B is located, and the second sub-pixel where the yellow (Y) color filter 128Y is located. In the second structure 104, two sets of R-QD's 148R and G-QD's 148G are provided.

Referring to FIGS. 3A and 3C, in the first half-frame, a voltage source 170 is configured to provide a voltage difference ΔV to the first transparent electrode 152 and the second transparent electrode 154 corresponding to each G-QD 148G, but not to the first transparent electrode 152 and the second transparent electrode 154 corresponding to each R-QD 148R. In this case, the first transparent electrode 152 and the second transparent electrode 154 corresponding to each G-QD 148G are provided with the voltage difference ΔV to form an electric field to control alignment of the PNLC or PDLC molecules of the PNLC or PDLC layer 146, such that the PNLC or PDLC molecules 146G aligned to the G-QD 148G are configured to be turned on to switch to a transparent state, as shown in FIG. 3C. On the other hand, the first transparent electrode 152 and the second transparent electrode 154 corresponding to each R-QD 148R are not provided with the voltage difference, and the PNLC or PDLC molecules 146R aligned to the R-QD 148R are randomly arranged to switch to a milky white state, as shown in FIG. 3C. In this case, when the blue light emitted by the blue light source (not shown in FIGS. 3A and 3C) enters the PNLC or PDLC layer 146, the PNLC or PDLC molecules 146G aligned to the G-QD 148G in the transparent state may allow the blue light to pass, and the PNLC or PDLC molecules 146R aligned to the R-QD 148R in the milky white state may scatter and diffuse the blue light. Thus, in the first half-frame, the blue light is guided toward the R-QD 148R but not to the G-QD 148G. When the R-QD 148R receives the blue light guided by the PNLC or PDLC molecules 146R aligned to the R-QD 148R, the R-QD 148R is excited by the blue light to emit the blue light and a red light toward the first structure 102. Meanwhile, the G-QD 148G does not receive the blue light, and is thus not excited and emits no light. Since the diffusion film 110 (not shown in FIGS. 3A and 3C) exists between the first structure 102 and the second structure 104, the blue light and the red light emitted by all the R-QD's 148R will be diffused toward the first sub-pixel and the second sub-pixel in the first structure 102. In the first sub-pixel, when the blue (B) color filter 128B receives the blue light and the red light emitted by the R-QD's 148R, the blue light propagates the blue (B) color filter 128B. In the second sub-pixel, when the yellow (Y) color filter 128Y receives the blue light and the red light emitted by the R-QD's 148R, the red light propagates the yellow (Y) color filter 128Y. Thus, in the first half-frame, the first sub-pixel is configured for displaying the blue light, and the second sub-pixel is configured for displaying the red light.

Referring to FIGS. 3B and 3D, in the second half-frame, the voltage source 170 is configured to provide a voltage difference ΔV to the first transparent electrode 152 and the second transparent electrode 154 corresponding to each R-QD 148R, but not to the first transparent electrode 152 and the second transparent electrode 154 corresponding to each G-QD 148G. In this case, the first transparent electrode 152 and the second transparent electrode 154 corresponding to each R-QD 148R are provided with the voltage difference ΔV to form an electric field to control alignment of the PNLC or PDLC molecules of the PNLC or PDLC layer 146, such that the PNLC or PDLC molecules 146R aligned to the R-QD 148R are configured to be turned on to switch to a transparent state, as shown in FIG. 3D. On the other hand, the first transparent electrode 152 and the second transparent electrode 154 corresponding to each G-QD 148G are not provided with the voltage difference, and the PNLC or PDLC molecules 146G aligned to the G-QD 148G are randomly arranged to switch to a milky white state, as shown in FIG. 3D. In this case, when the blue light emitted by the blue light source (not shown in FIGS. 3B and 3D) enters the PNLC or PDLC layer 146, the PNLC or PDLC molecules 146R aligned to the R-QD 148R in the transparent state may allow the blue light to pass, and the PNLC or PDLC molecules 146G aligned to the G-QD 148G in the milky white state may scatter and diffuse the blue light. Thus, in the second half-frame, the blue light is guided toward the G-QD 148G but not to the R-QD 148R. When the G-QD 148G receives the blue light guided by the PNLC or PDLC molecules 146G aligned to the G-QD 148G, the G-QD 148G is excited by the blue light to emit the blue light and a green light toward the first structure 102. Meanwhile, the R-QD 148R does not receive the blue light, and is thus not excited and emits no light. Since the diffusion film 110 (not shown in FIGS. 3B and 3D) exists between the first structure 102 and the second structure 104, the blue light and the green light emitted by all the G-QD's 148G will be diffused toward the first sub-pixel and the second sub-pixel in the first structure 102. In the first sub-pixel, when the blue (B) color filter 128B receives the blue light and the green light emitted by the G-QD's 148G, the blue light propagates the blue (B) color filter 128B. In the second sub-pixel, when the yellow (Y) color filter 128Y receives the blue light and the green light emitted by the G-QD's 148G, the green light propagates the yellow (Y) color filter 128Y. Thus, in the second half-frame, the first sub-pixel is configured for displaying the blue light, and the second sub-pixel is configured for displaying the green light.

As disclosed above, for each pixel, in the first half-frame, the first sub-pixel is configured for displaying the blue light, and the second sub-pixel is configured for displaying the red light; and in the second half-frame, the first sub-pixel is configured for displaying the blue light, and the second sub-pixel is configured for displaying the green light. Thus, by the display cell structure 100 as shown in FIGS. 1 and 2, the optical efficiency of each of the blue light, the red light and the green light at the color filter layer 128 of the first structure 102 will be about 45%, thus facilitating high optical efficiency, high brightness and high contrast of the display device.

Figure 4:
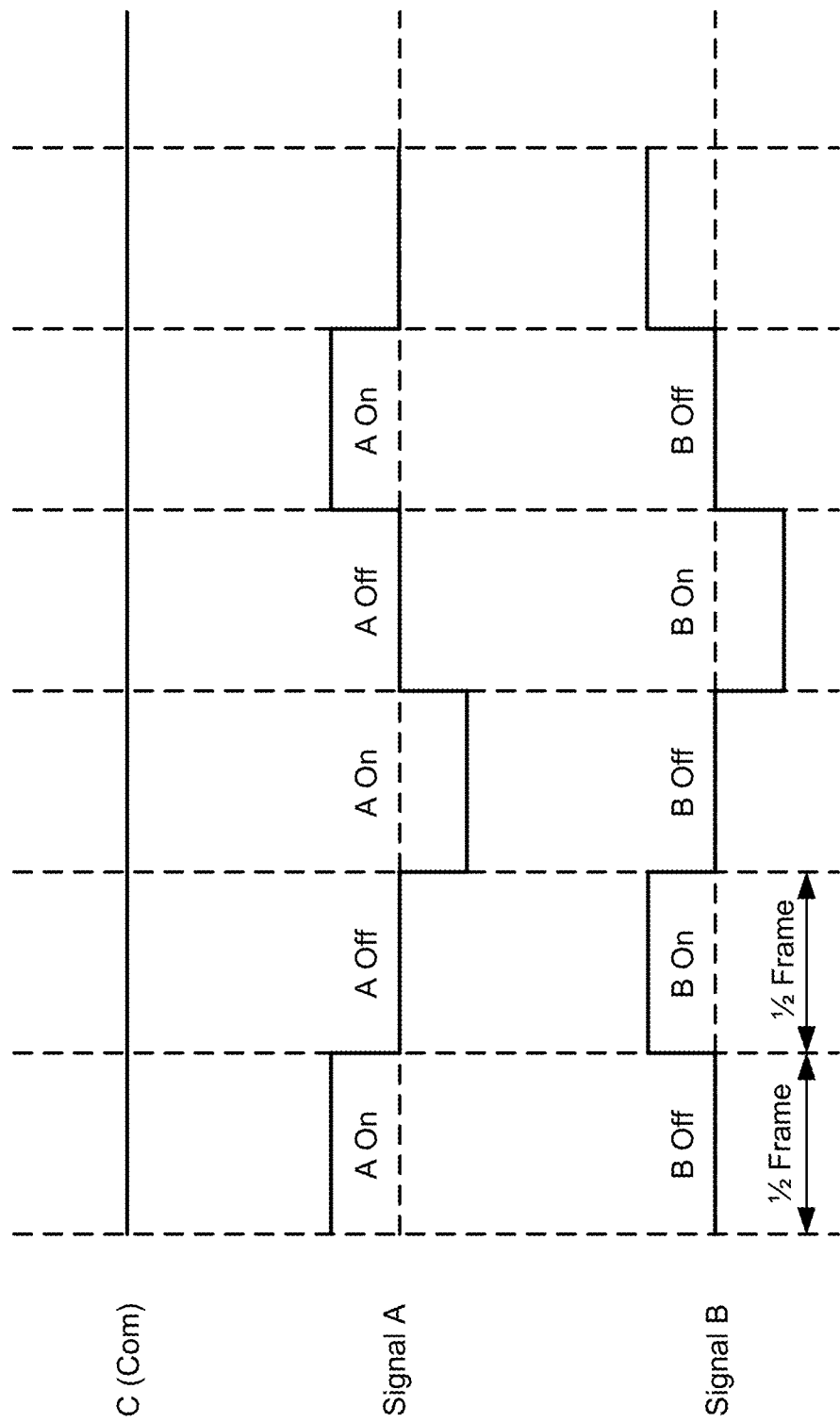
FIG. 4 schematically shows the voltage signals sent to the first transparent electrodes and the second transparent electrodes of the second structure of the display cell structure as shown in FIGS. 3A and 3B.
Figure 5A:
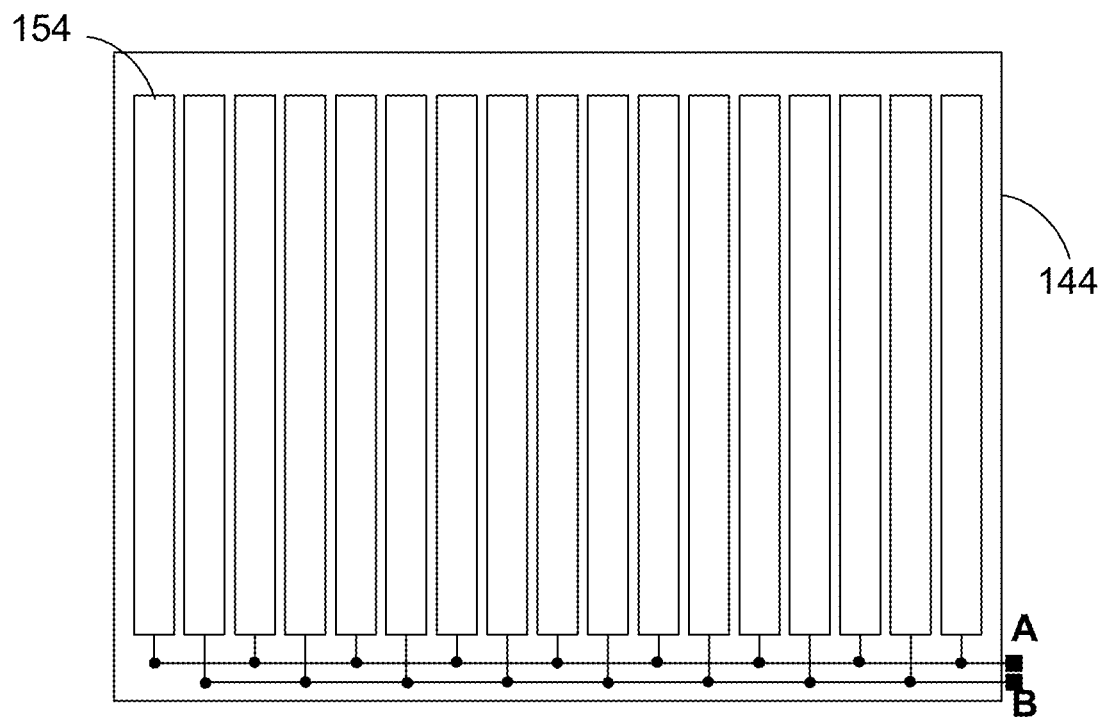
FIG. 5A schematically shows a top view of the fourth substrate and the second transparent electrodes of the second structure of the display cell structure according to certain embodiments of the present disclosure.
Figure 5B:
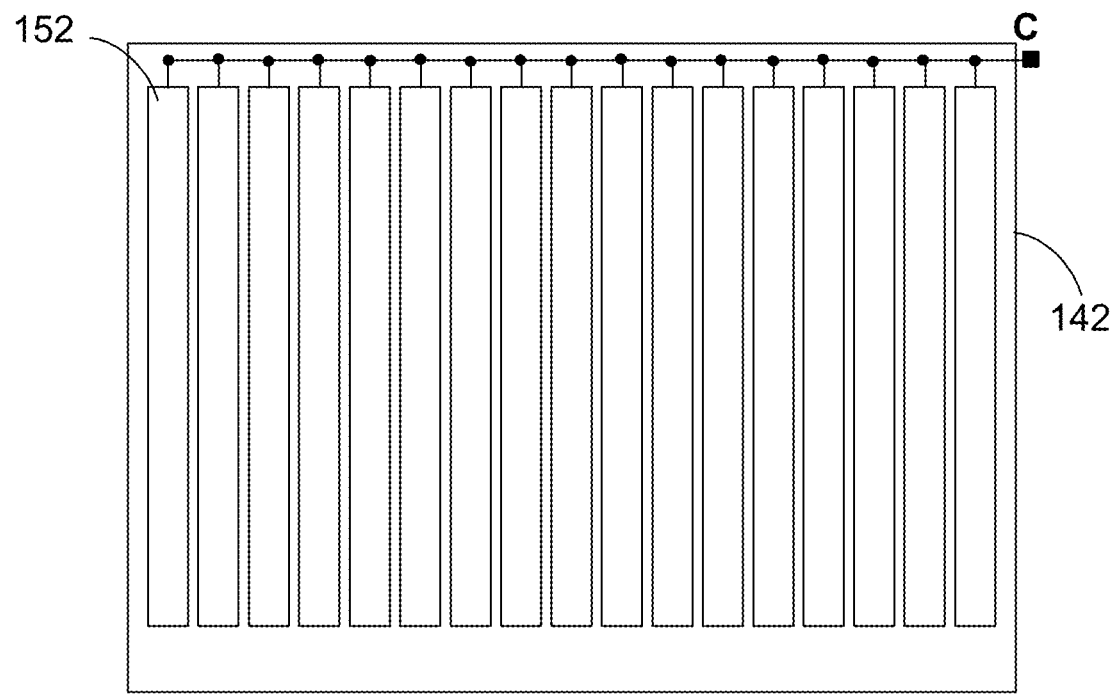
FIG. 5B schematically shows a bottom view of the third substrate and the first transparent electrodes of the second structure of the display cell structure according to certain embodiments of the present disclosure.

FIG. 4 schematically shows the voltage signals sent to the first transparent electrodes and the second transparent electrodes of the second structure of the display cell structure as shown in FIGS. 3A and 3B. As shown in FIG. 4, compared to a common voltage C, two sets of voltage signals A and B are provided, and in each of the half-frames, when the signal A is ON (ΔV≠0), the signal B is OFF (ΔV=0). Thus, one of the voltage signals A and B may be provided to the first transparent electrode 152 and the second transparent electrode 154 corresponding to each R-QD 148R, and the other of the voltage signals A and B may be provided to the first transparent electrode 152 and the second transparent electrode 154 corresponding to each G-QD 148G. For example, FIG. 5A schematically shows a top view of the fourth substrate and the second transparent electrodes of the second structure of the display cell structure according to certain embodiments of the present disclosure, and FIG. 5B schematically shows a bottom view of the third substrate and the first transparent electrodes of the second structure of the display cell structure according to certain embodiments of the present disclosure. As shown in FIGS. 5A and 5B, each of the first transparent electrodes 152 and the second transparent electrodes 154 is a strip-shaped electrode extending in a column direction. In this case, the first transparent electrodes 152 formed on the third substrate 142 (i.e., the top substrate of the second structure 104) may be provided with the common voltage C as shown in FIG. 4, so that the first transparent electrodes 152 function as the common electrodes. For the second transparent electrodes 154 formed on the fourth substrate 144 (i.e., the bottom substrate of the second structure 104), the second transparent electrodes 154 are alternately provided with the voltage signals A and B as shown in FIG. 4, such that each of the second transparent electrodes 154 may correspond to and be aligned to one of the R-QD's 148R and the G-QD's 148G, which are also alternately disposed, as shown in FIG. 1.

Figure 6A:
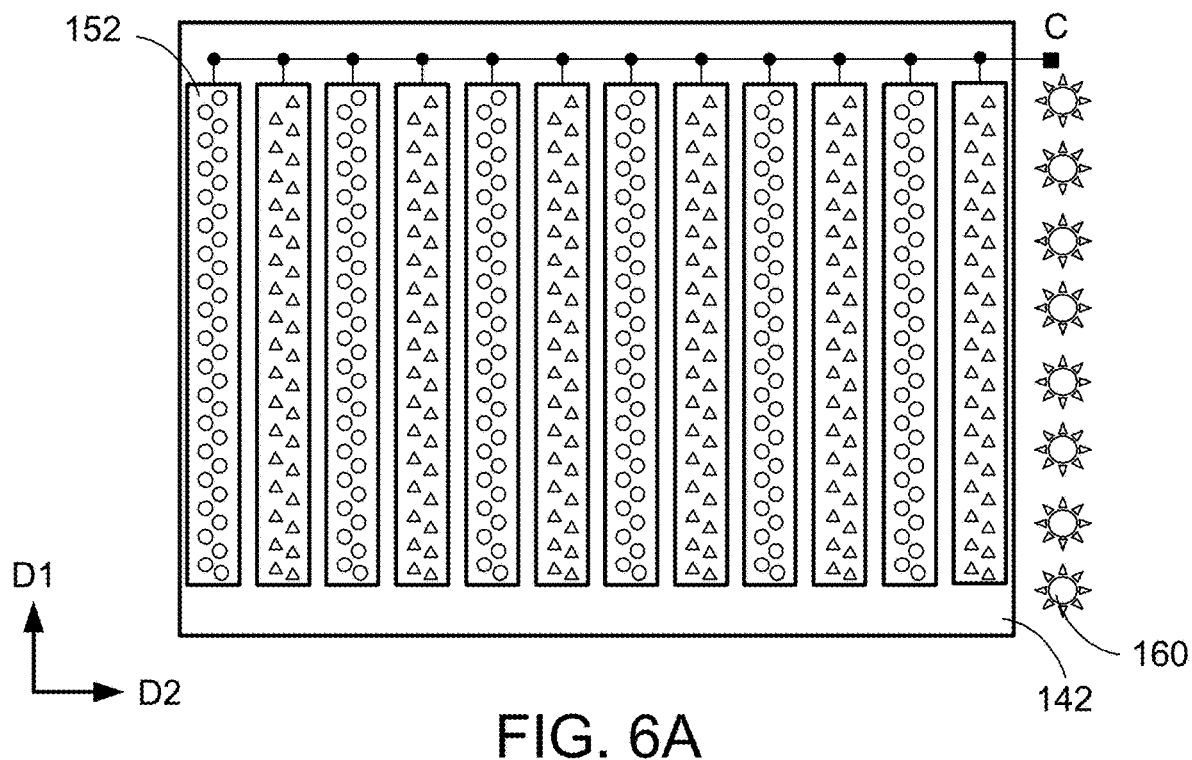
FIG. 6A schematically shows a bottom view of the third substrate, the QD layer, and the first transparent electrodes of the second structure of the display cell structure according to one embodiment of the present disclosure.
Figure 6B:
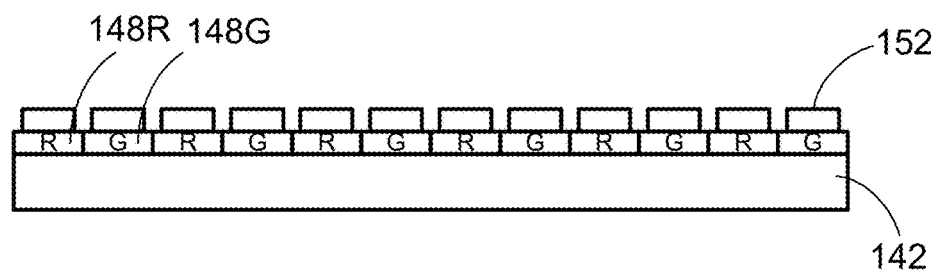
FIG. 6B schematically shows a sectional view of the third substrate, the QD layer, and the first transparent electrodes of the second structure of the display cell structure as shown in FIG. 6A.

In certain embodiments, the components of the second structure 104, such as the first transparent electrodes 152, the second transparent electrodes 154, the R-QD's 148R and G-QD's 148G of the QD layer 148, and the blue light source 160, may be arranged in different configurations. For example, FIGS. 6A and 6B schematically show the third substrate, the QD layer, and the first transparent electrodes of the second structure of the display cell structure according to one embodiment of the present disclosure, where FIG. 6A shows a bottom view, and FIG. 6B shows a sectional view, with the third substrate 142 (i.e., the top substrate of the second structure 104) being arranged in an upside-down position. Specifically, in this embodiment, the structure as shown in FIGS. 6A and 6B is similar to the structure as shown in FIG. 5B, where the first transparent electrodes 152 are strip-shaped electrodes extending in a column direction D1, and each of the R-QD's 148R and the G-QD's 148G corresponds to one of the first transparent electrodes 152. To distinguish the R-QD's 148R and the G-QD's 148G, as shown in FIG. 6A (and all other drawings showing the QD's in bottom views), the R-QD's 148R are shown by circles, and the G-QD's 148G are shown by triangles. In this case, the first transparent electrodes 152 may be provided with the common voltage C as shown in FIG. 4, so that the first transparent electrodes 152 function as the common electrodes. Further, as shown in FIG. 6A, the blue light source 160 includes a plurality of blue light emitting diode (LED) chips disposed in a column at the right side of the second structure 104, which is parallel to the long sides of the first transparent electrodes 152 (i.e., the strip-shaped electrodes).

Figure 7:
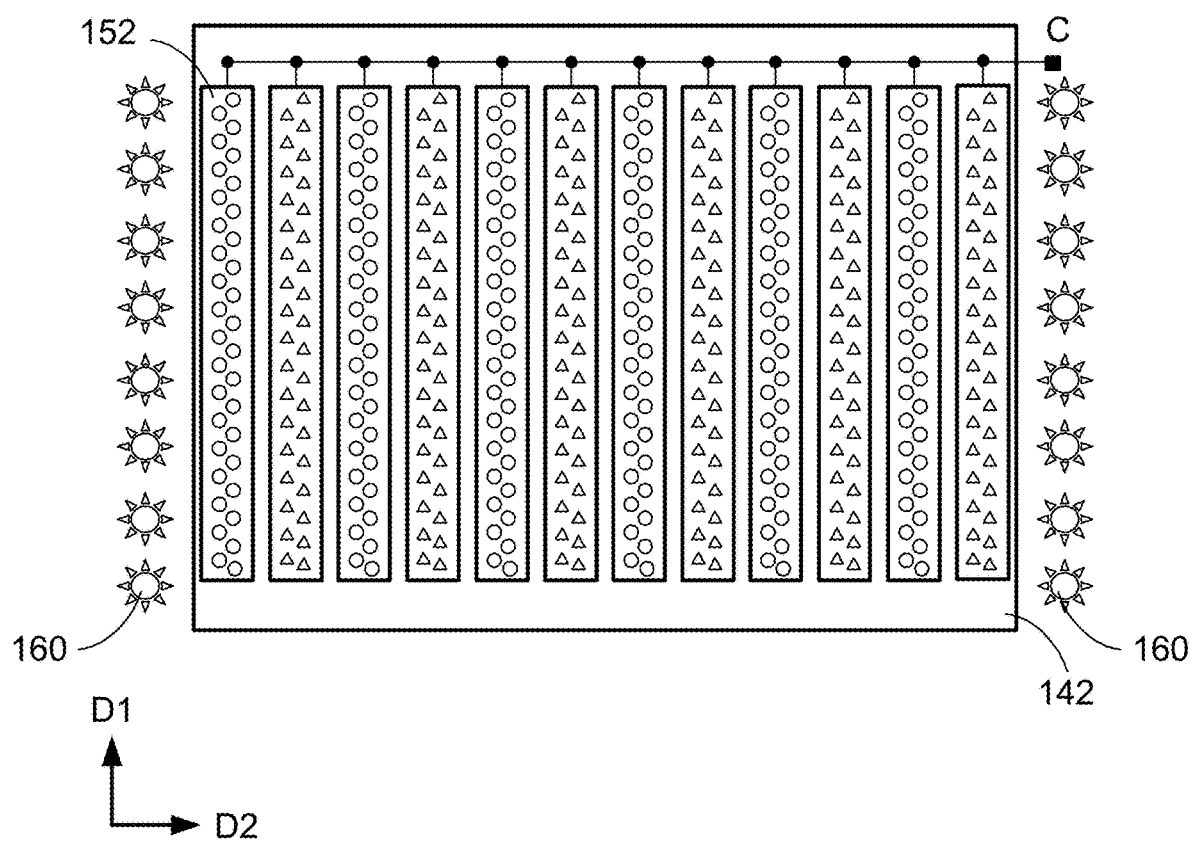
FIG. 7 schematically shows a bottom view of the third substrate, the QD layer, and the first transparent electrodes of the second structure of the display cell structure according to another embodiment of the present disclosure.

FIG. 7 schematically shows a bottom view of the third substrate, the QD layer, and the first transparent electrodes of the second structure of the display cell structure according to another embodiment of the present disclosure. Specifically, in this embodiment, the structure as shown in FIG. 7 is similar to the structure as shown in FIG. 6A, where the first transparent electrodes 152 are strip-shaped electrodes extending in a column direction D1, and each of the R-QD's 148R and the G-QD's 148G corresponds to one of the first transparent electrodes 152. The only difference between the structure as shown in FIG. 7 from the structure as shown in FIG. 6A exists in that, in FIG. 7, the blue light source 160 includes multiple blue LED chips disposed in two columns, respectively located at the left and right sides of the second structure 104, which are parallel to the long sides of the first transparent electrodes 152 (i.e., the strip-shaped electrodes). In other words, two set of blue LED chips are provided at both sides of the second structure 104 as the blue light source 160.

Figure 8A:
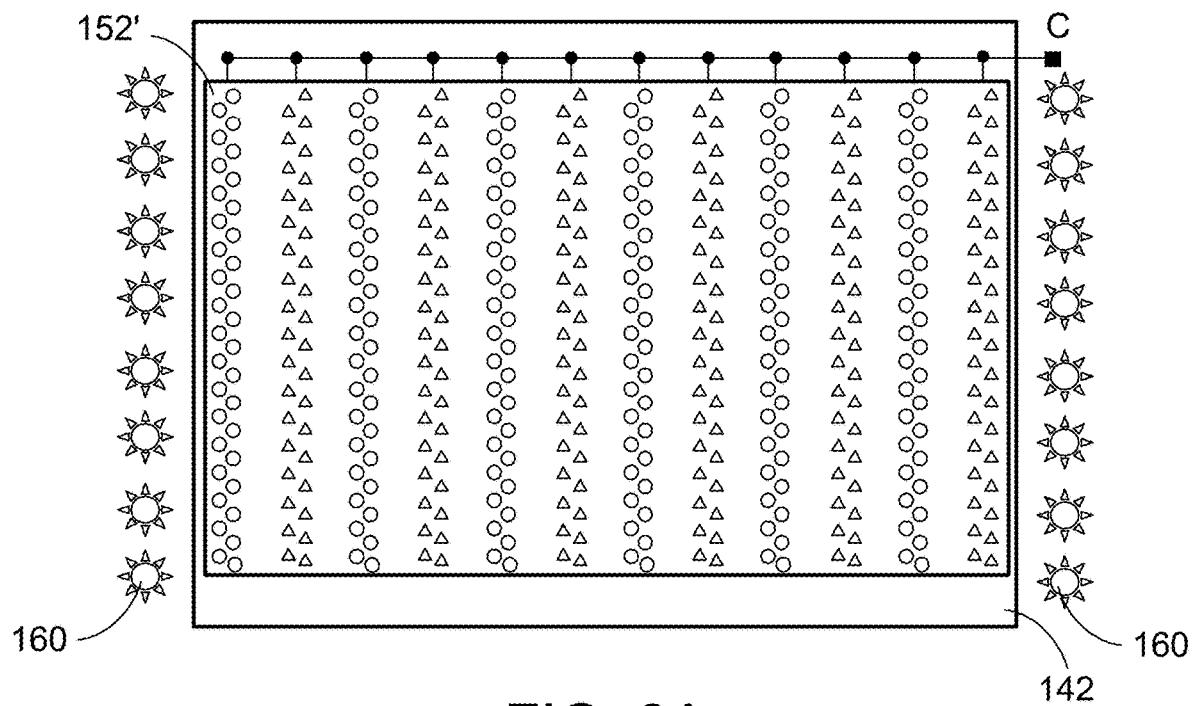
FIG. 8A schematically shows a bottom view of the third substrate, the QD layer, and the first transparent electrode of the second structure of the display cell structure according to a further embodiment of the present disclosure, where the first transparent electrode is a plate-shaped common electrode.
Figure 8B:
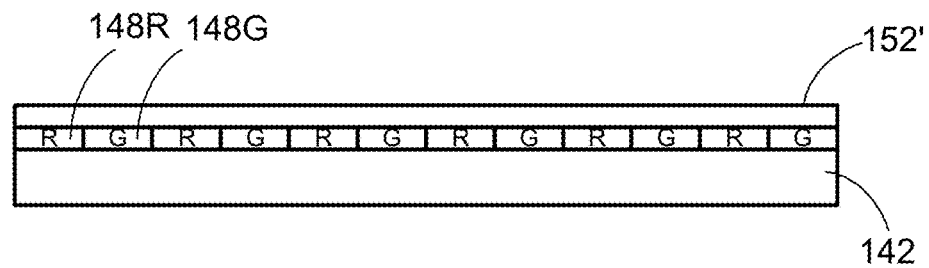
FIG. 8B schematically shows a sectional view of the third substrate, the QD layer, and the first transparent electrode of the second structure of the display cell structure as shown in FIG. 8A.

FIGS. 8A and 8B schematically show the third substrate, the QD layer, and the first transparent electrode of the second structure of the display cell structure according to a further embodiment of the present disclosure, where FIG. 8A shows a bottom view, and FIG. 8B shows a sectional view, with the third substrate 142 (i.e., the top substrate of the second structure 104) being arranged in an upside-down position. Specifically, in this embodiment, the only differences between the structure as shown in FIGS. 8A and 8B from the structure as shown in FIGS. 6A and 6B exists in that, as shown in FIG. 8A, the blue light source 160 includes multiple blue LED chips disposed in two columns, respectively located at the left and right sides of the second structure 104; and that the first transparent electrode 152' is a plate-shaped common electrode instead of a plurality of strip-shaped electrodes. In other words, only one plate-shaped common electrode is provided on the QD layer 148 to function as the first transparent electrode 152'.

Figure 9A:
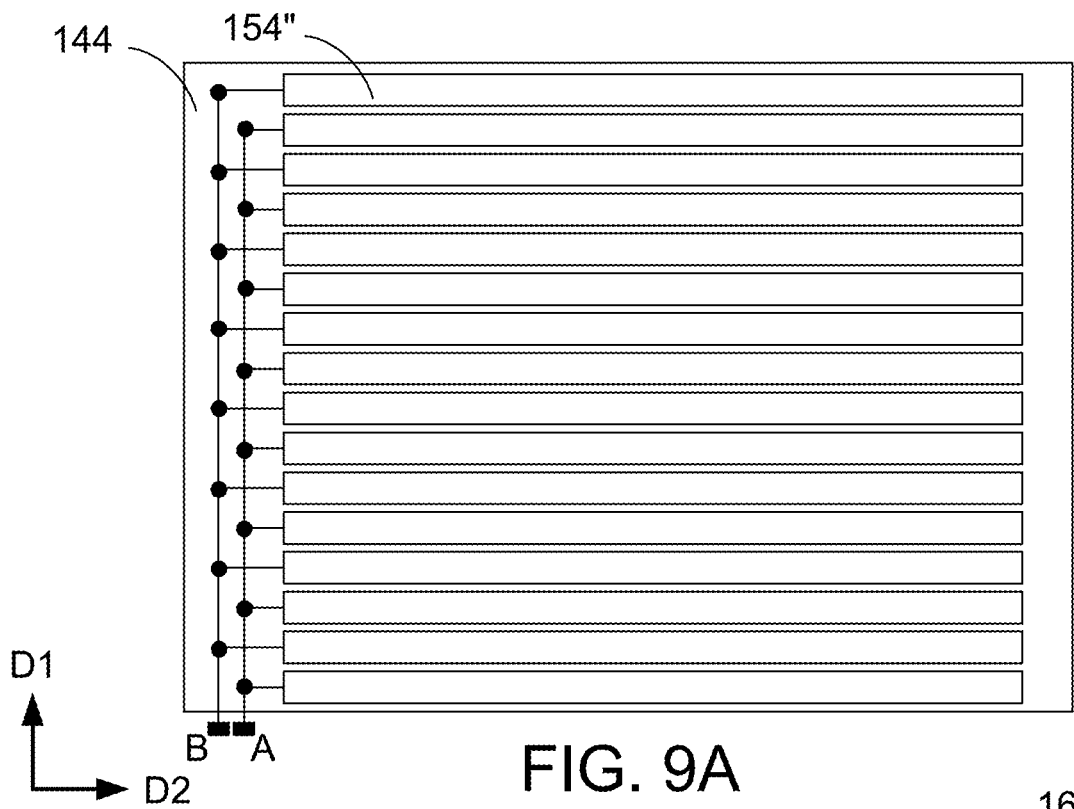
FIG. 9A schematically shows a top view of the fourth substrate and the second transparent electrodes of the second structure of the display cell structure according to yet a further embodiment of the present disclosure.
Figure 9B:
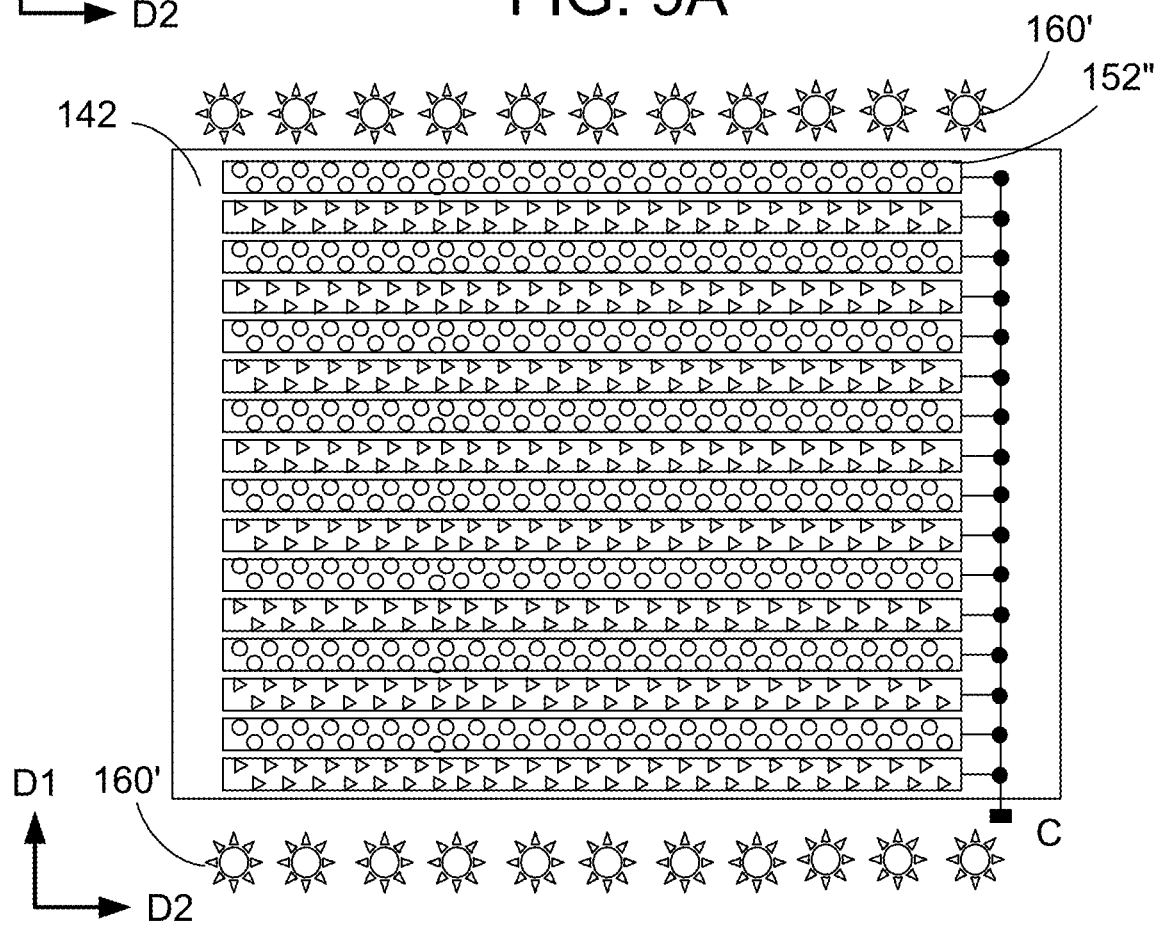
FIG. 9B schematically shows a bottom view of the third substrate and the first transparent electrodes of the second structure of the display cell structure according to yet a further embodiment of the present disclosure.

FIG. 9A schematically shows a top view of the fourth substrate and the second transparent electrodes of the second structure of the display cell structure according to yet a further embodiment of the present disclosure, and FIG. 9B schematically shows a bottom view of the third substrate and the first transparent electrodes of the second structure of the display cell structure according to yet a further embodiment of the present disclosure. Specifically, in this embodiment, the differences between the structures as shown in FIGS. 9A and 9B and the structures as shown in FIGS. 5A and 5B exists in that the first transparent electrodes 152" and the second transparent electrodes 154" are strip-shaped electrodes extending in a row direction D2. Further, as shown in FIG. 9B, the blue light source 160' includes multiple blue LED chips disposed in two rows, respectively located at the upper and lower sides of the second structure 104. In other words, the two set of blue LED chips are provided at both sides of the second structure 104 as the blue light source 160'.

Figure 10A:
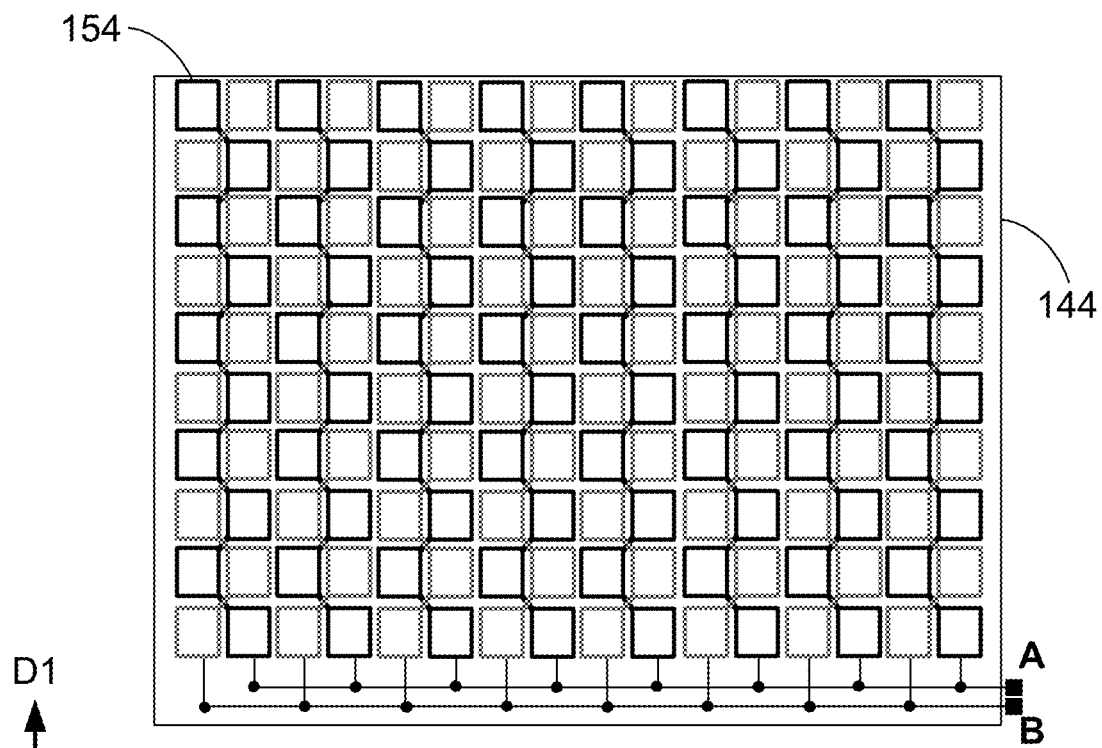
FIG. 10A schematically shows a top view of the fourth substrate and the second transparent electrodes of the second structure of the display cell structure according to yet another embodiment of the present disclosure.
Figure 10B:
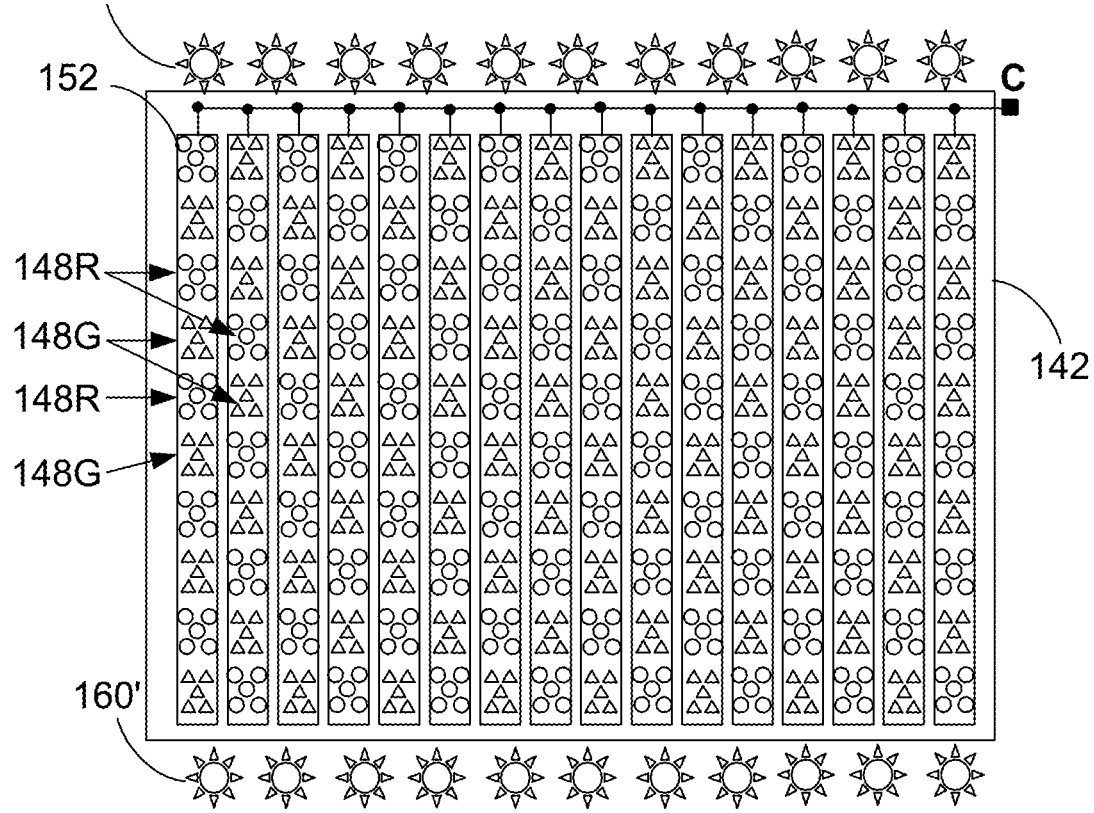
FIG. 10B schematically shows a bottom view of the third substrate and the first transparent electrodes of the second structure of the display cell structure according to yet another embodiment of the present disclosure.

FIG. 10A schematically shows a top view of the fourth substrate and the second transparent electrodes of the second structure of the display cell structure according to yet another embodiment of the present disclosure, and FIG. 10B schematically shows a bottom view of the third substrate and the first transparent electrodes of the second structure of the display cell structure according to yet another embodiment of the present disclosure. Specifically, in this embodiment, the differences between the structures as shown in FIGS. 10A and 10B and the structures as shown in FIGS. 5A and 5B exists in that, as shown in FIG. 10B, the G-QD's 148G and the R-QD's 148R are alternately disposed along a row direction D2 and a column direction D1 to form a matrix, such that each G-QD 148G is adjacent to one of the R-QD's 148R in the row direction D2 and in the column direction D1. In this case, as shown in FIG. 10A, the second transparent electrodes 154 are also broken into a corresponding matrix of small portions corresponding to the G-QD's 148G and the R-QD's 148R, such that each of the small portions of the second transparent electrodes 154 is correspondingly provided with the voltage signals A and B for the G-QD's 148G and the R-QD's 148R. Further, as shown in FIG. 10B, the blue light source 160' includes multiple blue LED chips disposed in two rows, respectively located at the upper and lower sides of the second structure 104. In other words, the two set of blue LED chips are provided at both sides of the second structure 104 as the blue light source 160'.

Figure 11A:
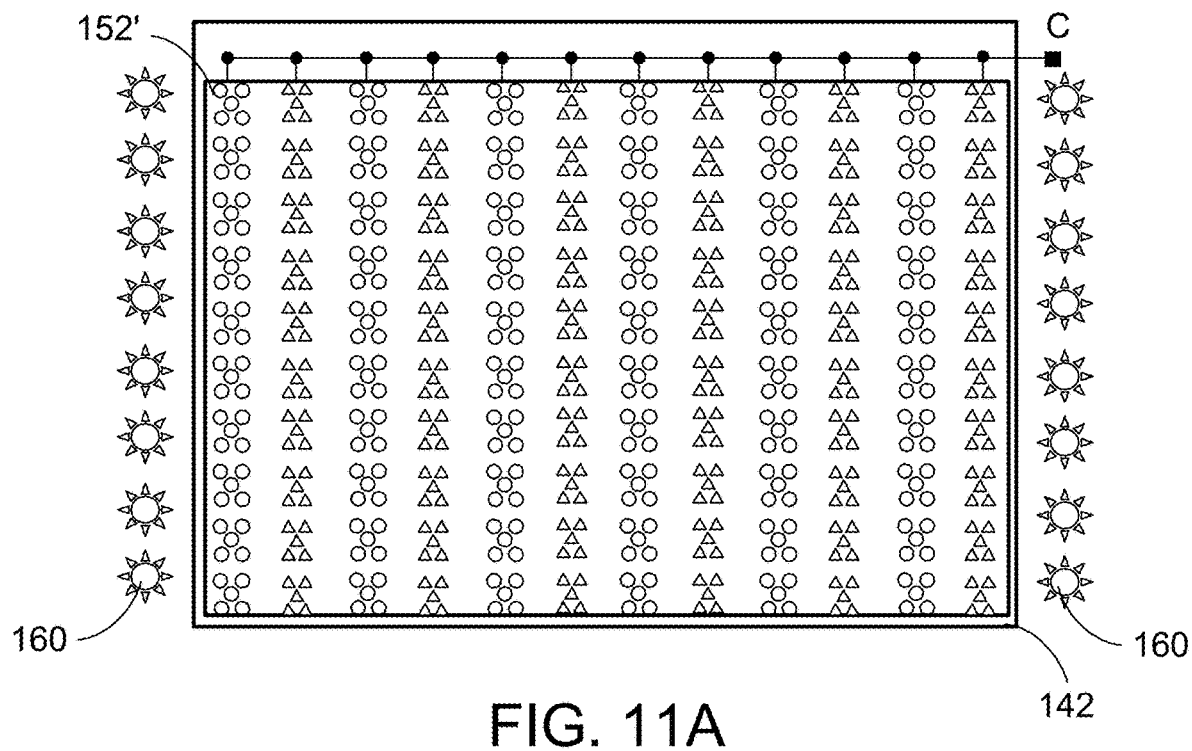
FIG. 11A schematically shows a bottom view of the third substrate, the QD layer, and the first transparent electrodes of the second structure of the display cell structure according to one embodiment of the present disclosure.
Figure 11B:
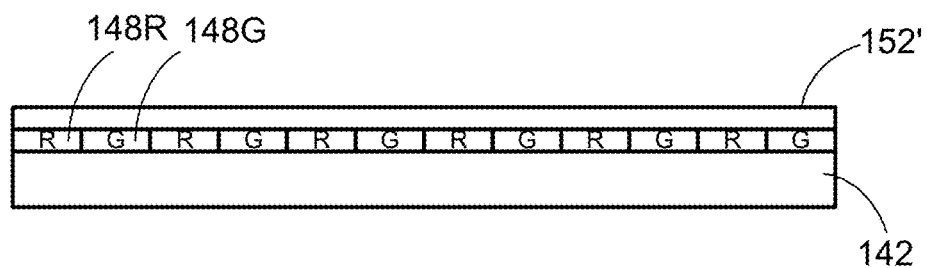
FIG. 11B schematically shows a sectional view of the third substrate, the QD layer, and the first transparent electrodes of the second structure of the display cell structure as shown in FIG. 11A.

FIGS. 11A and 11B schematically show the third substrate, the QD layer, and the first transparent electrodes of the second structure of the display cell structure according to one embodiment of the present disclosure, where FIG. 11A shows a bottom view, and FIG. 11B shows a sectional view, with the third substrate 142 (i.e., the top substrate of the second structure 104) being arranged in an upside-down position. Specifically, in this embodiment, the only differences between the structure as shown in FIGS. 11A and 11B from the structure as shown in FIG. 10B exists in that, as shown in FIG. 11A, the blue light source 160 includes multiple blue LED chips disposed in two columns, respectively located at the left and right sides of the second structure 104; and that the first transparent electrode 152' is a plate-shaped common electrode instead of a plurality of strip-shaped electrodes. In other words, only one plate-shaped common electrode is provided on the QD layer 148 to function as the first transparent electrode 152'.

Figure 12A:
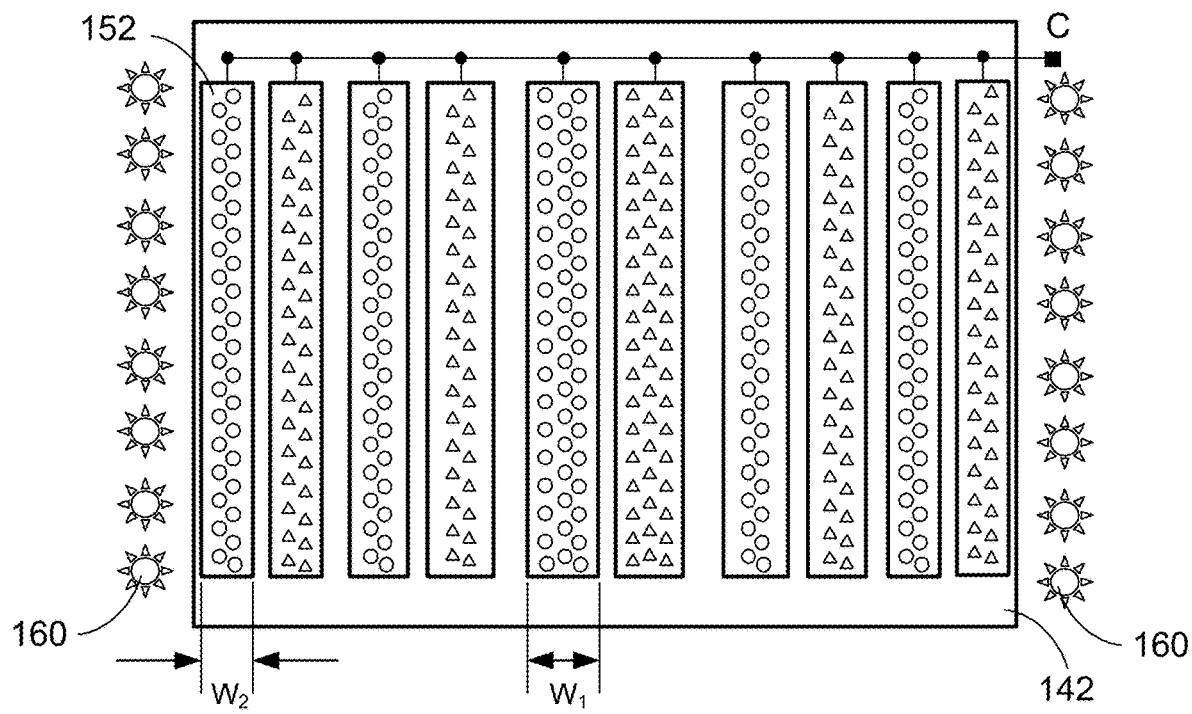
FIG. 12A schematically shows a bottom view of the third substrate, the QD layer, and the first transparent electrodes of the second structure of the display cell structure according to another embodiment of the present disclosure.
Figure 12B:
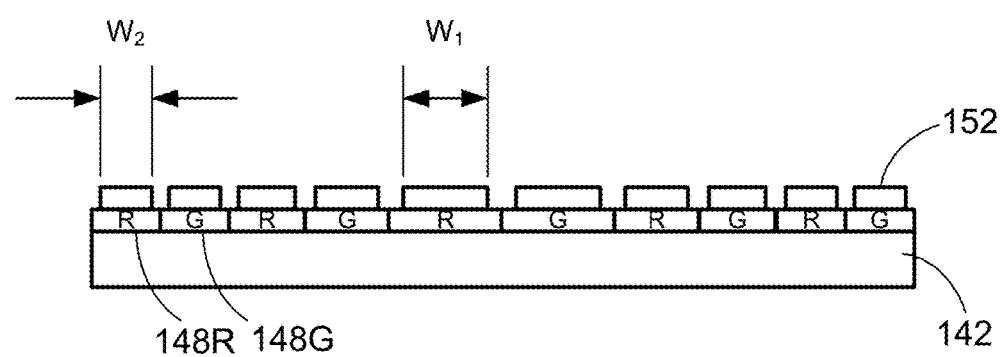
FIG. 12B schematically shows a sectional view of the third substrate, the QD layer, and the first transparent electrodes of the second structure of the display cell structure as shown in FIG. 12A.
Figure 12C:
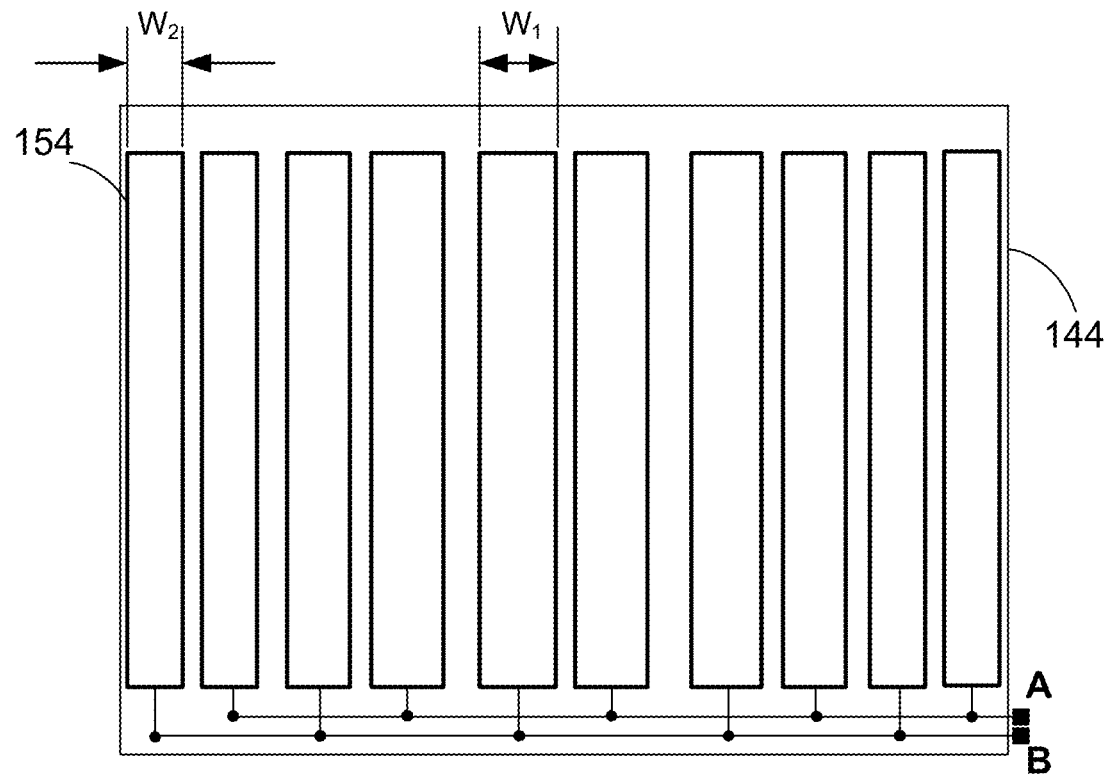
FIG. 12C schematically shows a top view of the fourth substrate and the second transparent electrodes of the second structure of the display cell structure according to another embodiment of the present disclosure.
Figure 12D:
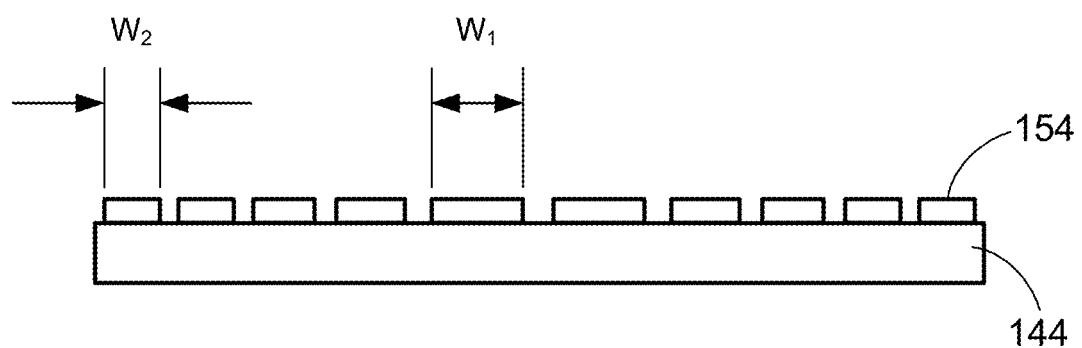
FIG. 12D schematically shows a sectional view of the fourth substrate and the second transparent electrodes of the second structure of the display cell structure as shown in FIG. 12C.

FIGS. 12A and 12B schematically show the third substrate, the QD layer, and the first transparent electrodes of the second structure of the display cell structure according to another embodiment of the present disclosure, where FIG. 12A shows a bottom view, and FIG. 12B shows a sectional view, with the third substrate 142 (i.e., the top substrate of the second structure 104) being arranged in an upside-down position. Correspondingly, FIGS. 12C and 12D schematically show the fourth substrate and the second transparent electrodes of the second structure of the display cell structure according to another embodiment of the present disclosure, where FIG. 12C show a top view, and FIG. 12D shows a sectional view, with the fourth substrate 144 (i.e., the bottom substrate of the second structure 104) being arranged to correspond to the structure as shown in FIGS. 12A and 12B. Specifically, in this embodiment, the only differences between the structure as shown in FIGS. 12A and 12B from the structure as shown in FIG. 7 exists in that, as shown in FIGS. 12A and 12B, the first transparent electrodes 152 have different widths. In particular, the first transparent electrodes 152 located at the center area of the second structure 104 is located farther away from the blue light sources 160 than the first transparent electrodes 152 located at the side areas of the second structure 104. As shown in FIGS. 12A and 12B, a first width $W_1$ of one of the first transparent electrodes 152 located farther away from the blue light sources 160 is greater than a second width $W_2$ of another one the first transparent electrodes 152 located closer to the blue light sources 160. Further, as shown in FIGS. 12C and 12D, since the first transparent electrodes 152 and the second transparent electrodes 154 are correspondingly disposed, each of the second transparent electrodes 154 has substantially the identical width to the corresponding first transparent electrode 152. Thus, the first width $W_1$ of the one of the second transparent electrodes 154 located farther away from the blue light sources 160 is greater than the second width $W_2$ of the one the second transparent electrodes 154 located closer to the blue light sources 160.

Figure 13A:
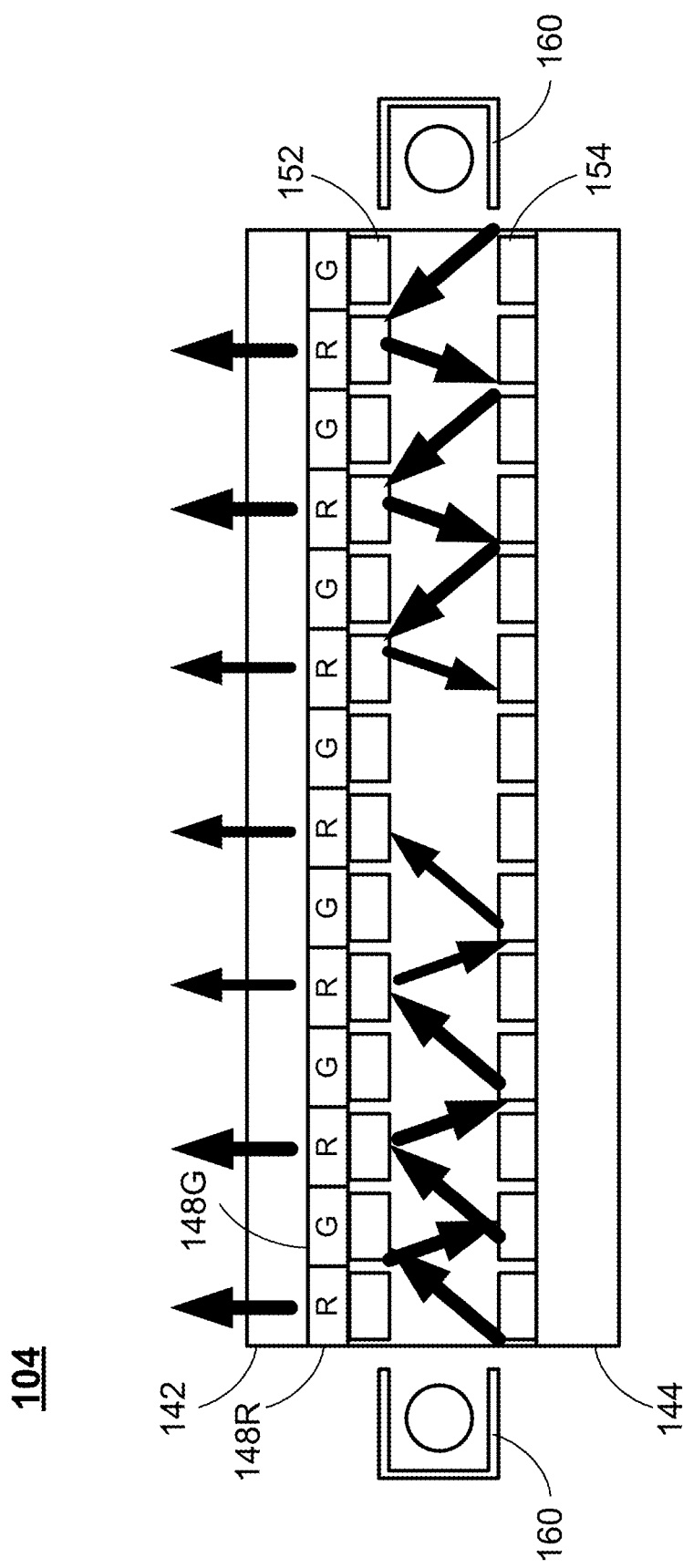
FIG. 13A schematically shows the light transmission within the second structure of the display device according to certain embodiments of the present disclosure, where the blue light sources are disposed at two long sides of the second structure.
Figure 13B:
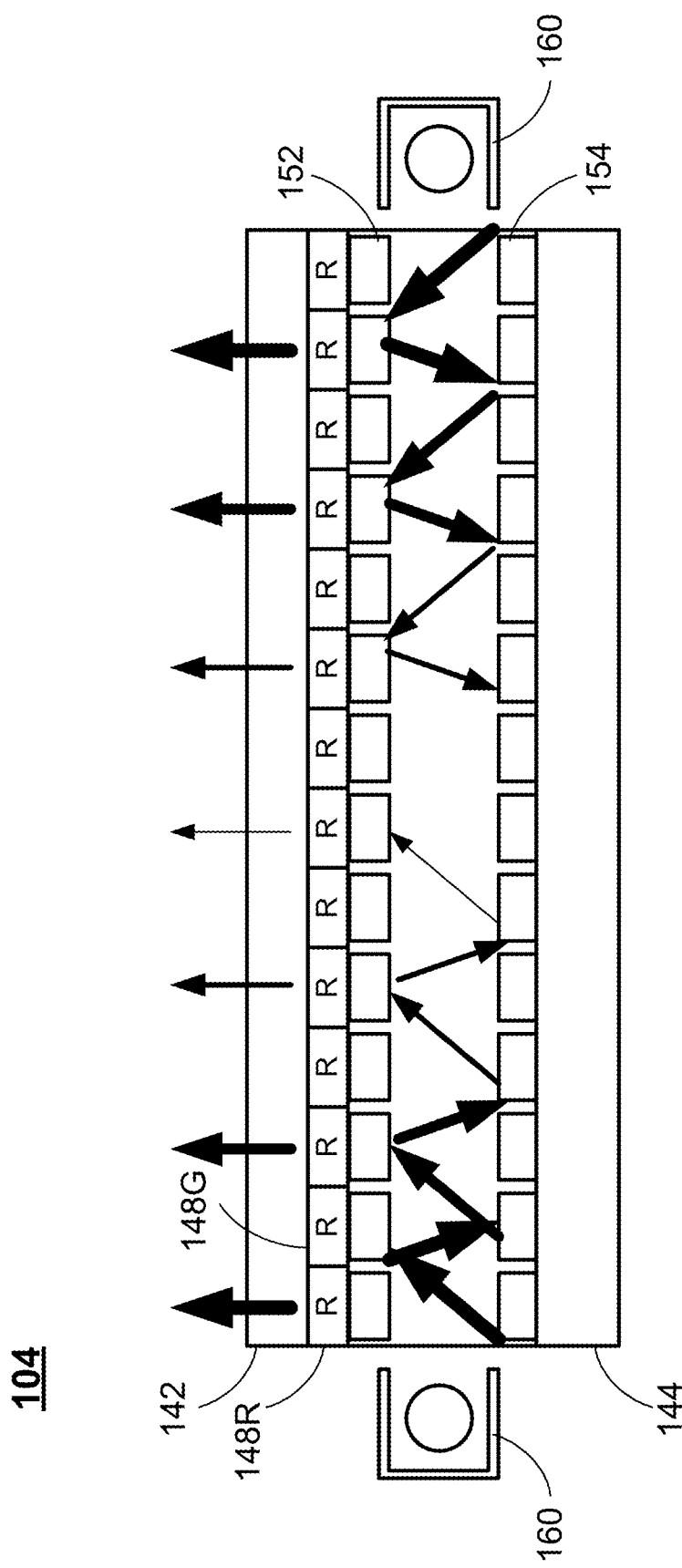
FIG. 13B schematically shows the light transmission within the second structure of the display device according to certain embodiments of the present disclosure, where the blue light sources are disposed at two short sides of the second structure.

As disclosed above, in certain embodiments, two sets of blue light sources 160 can be disposed at two sides of the display cell structure 100. Since the typical display cell structure 100 has a substantially rectangular shape, in certain embodiments, when each of the first transparent electrodes 152 and the second transparent electrodes 154 is a strip-shaped electrode, preferably, the two sets of the blue light sources 160 are disposed at two sides of the second structure 104 parallel to the long sides of the first transparent electrodes 152 (i.e., the strip-shaped electrodes) to prevent from light decay. Specifically, FIGS. 13A and 13B schematically shows the light transmission within the second structure of the display device according to two different embodiments of the present disclosure. For illustration purposes, the sizes of the second structure 104 in the cross-sectional views of FIGS. 13A and 13B are not much different. However, FIG. 13A shows that the blue light sources 160 are disposed at two sides of the second structure 104 parallel to the long sides of the first transparent electrodes 152 (i.e., the strip-shaped electrodes), and FIG. 13B shows that the blue light sources 160 are disposed at two sides of the second structure 104 parallel to the short sides of the first transparent electrodes 152 (i.e., the strip-shaped electrodes). As shown in FIG. 13A, when the blue light sources 160 are disposed at the two sides of the second structure 104 parallel to the long sides of the first transparent electrodes 152 (i.e., the strip-shaped electrodes), the blue light emitted by the two blue light sources 160 can propagate through the PNLC or PDLC layer 146 into the center area of the second structure 104 with less light decay, because the total length of the light transmission paths of the blue light is shorter. In comparison, as shown in FIG. 13B, when the blue light sources 160 are disposed at the two sides of the second structure 104 parallel to the short sides of the first transparent electrodes 152 (i.e., the strip-shaped electrodes), the total length of the light transmission paths of the blue light is increased. Thus, the blue light emitted by the two blue light sources 160 will propagate through the PNLC or PDLC layer 146 into the center area of the second structure 104 with greater light decay, thus affecting the optical efficiency at the center area of the display cell structure 100.

Figure 14:
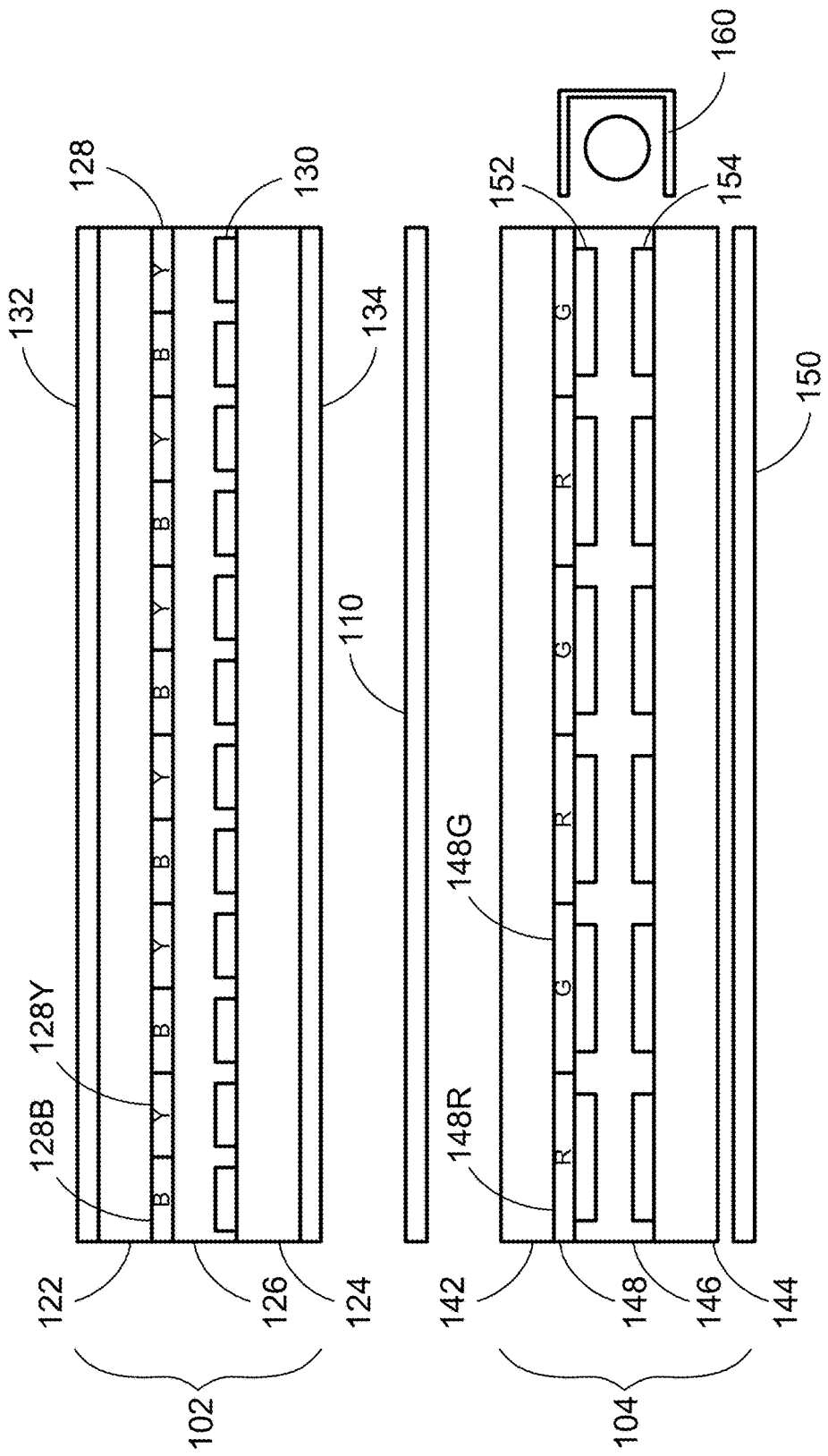
FIG. 14 schematically shows a cross-sectional view of a display cell structure of a display device according to another embodiment of the present disclosure.

As disclosed above, in the embodiment as shown in FIG. 1, a ratio of the width of each G-QD 148G and each R-QD 148R to the width of each of the blue (B) color filter 128B and each of the yellow (Y) color filter 128Y is 1:1. In certain embodiments, however, the ratio can be changed such that the width of each G-QD 148G and each R-QD 148R is greater than the width of each of the blue (B) color filter 128B and each of the yellow (Y) color filter 128Y. FIG. 14 schematically shows a cross-sectional view of a display cell structure of a display device according to another embodiment of the present disclosure. In this embodiment, as shown in FIG. 14, the width of each G-QD 148G and each R-QD 148R is substantially twice of the width of each of the blue (B) color filter 128B and each of the yellow (Y) color filter 128Y. In other words, the ratio of the width of each G-QD 148G and each R-QD 148R to the width of each of the blue (B) color filter 128B and each of the yellow (Y) color filter 128Y is 2:1. In certain embodiments, preferably, the ratio of the width of each G-QD 148G and each R-QD 148R to the width of each of the blue (B) color filter 128B and each of the yellow (Y) color filter 128Y can be in the range between 1:1 and 3:1.

In another aspect of the disclosure, a display method may be performed using the display cell structure as described in the foregoing embodiments. In a first half-frame, a voltage difference is provided to the first transparent electrode and the second transparent electrode corresponding to each G-QD to form an electric field to control alignment of PNLC or PDLC molecules of the PNLC or PDLC layer corresponding to each G-QD, and no voltage difference is provided to the first transparent electrode and the second transparent electrode corresponding to each R-QD, such that the PNLC or PDLC molecules aligned to the G-QD are configured to be turned on to switch to a transparent state, and the PNLC or PDLC molecules aligned to the R-QD are randomly arranged to scatter and diffuse the blue light emitted by the blue light source, such that the blue light is guided toward the R-QD. In a second half-frame, the voltage difference is provided to the first transparent electrode and the second transparent electrode corresponding to each R-QD to form an electric field to control alignment of the PNLC or PDLC molecules of the PNLC or PDLC layer corresponding to each R-QD, and no voltage difference is provided to the first transparent electrode and the second transparent electrode corresponding to each G-QD, such that the PNLC or PDLC molecules aligned to the R-QD are configured to be turned on to switch to the transparent state, and the PNLC or PDLC molecules aligned to the G-QD are randomly arranged to scatter and diffuse the blue light emitted by the blue light source, such that the blue light is guided toward the G-QD.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A display cell structure, comprising:
   a first structure, comprising:
      a first substrate and a second substrate spaced apart from each other;
      a liquid crystal layer disposed between the first substrate and the second substrate, the liquid crystal layer defining a plurality of pixels, and each of the plurality of pixels defining a first sub-pixel and a second sub-pixel; and
      a color filter layer disposed on the first substrate facing the liquid crystal layer, wherein in each pixel, the color filter layer comprises a blue (B) color filter in the first sub-pixel and a yellow (Y) color filter in the second sub-pixel;
   a second structure, wherein the first structure is disposed on the second structure, and the second structure comprises:
      a third substrate and a fourth substrate spaced apart from each other, wherein the third substrate is located closer to the second substrate of the first structure than the fourth substrate;
      a polymer networked liquid crystal (PNLC) or polymer dispersed liquid crystal (PDLC) layer disposed between the third substrate and the fourth substrate;
      at least one first transparent electrode disposed on the third substrate and facing the PNLC or PDLC layer;
      at least one second transparent electrode correspondingly disposed on the fourth substrate and facing the PNLC or PDLC layer;
      a quantum material layer disposed between the third substrate and the at least one first transparent electrode, wherein the quantum material layer comprises a red quantum material (R-quantum material) and a green quantum material (G-quantum material); and
      a blue light source emitting a blue light toward the PNLC or PDLC layer,
   wherein for each of the pixels,
      in a first half-frame, the first transparent electrode and the second transparent electrode corresponding to each G-quantum material are provided with a voltage difference to form an electric field to control alignment of PNLC or PDLC molecules of the PNLC or PDLC layer, and the first transparent electrode and the second transparent electrode corresponding to each R-quantum material are not provided with the voltage difference, such that the PNLC or PDLC molecules aligned to the G-quantum material are configured to be turned on to switch to a transparent state, and the PNLC or PDLC molecules aligned to the R-quantum material are randomly arranged to scatter and diffuse the blue light emitted by the blue light source, such that the blue light is guided toward the R-quantum material; and
      in a second half-frame, the first transparent electrode and the second transparent electrode corresponding to each R-quantum material are provided with the voltage difference to form the electric field to control alignment of PNLC or PDLC molecules of the PNLC or PDLC layer, and the first transparent electrode and the second transparent electrode corresponding to each G-quantum material are not provided with the voltage difference, such that the PNLC or PDLC molecules aligned to the R-quantum material are configured to be turned on to switch to the transparent state, and the PNLC or PDLC molecules aligned to the G-quantum material are randomly arranged to scatter and diffuse the blue light emitted by the blue light source, such that the blue light is guided toward the G-quantum material.

2. The display cell structure of claim 1, further comprising:
   a diffusion film disposed between the first structure and the second structure.

3. The display cell structure of claim 1, wherein the second structure further comprises:
   a reflection sheet disposed on the fourth substrate and facing an opposite side to the PNLC or PDLC layer.

4. The display cell structure of claim 1, wherein the first structure further comprises:
   a first polarizer disposed on the first substrate facing an opposite side of the liquid crystal layer; and
   a second polarizer disposed on the second substrate facing an opposite side of the liquid crystal layer.

5. The display cell structure of claim 1, wherein a ratio of a width of each G-quantum material and each R-quantum material to a width of each of the blue (B) color filter and each of the yellow (Y) color filter is in a range of 1:1 to 3:1.

6. The display cell structure of claim 1, wherein for each of the pixels,
   in the first half-frame, when the R-quantum material receives the blue light guided by the PNLC or PDLC molecules aligned to the R-quantum material, the R-quantum material is excited by the blue light to emit the blue light and a red light toward the first structure; and
   in the second half-frame, when the G-quantum material receives the blue light guided by the PNLC or PDLC molecules aligned to the G-quantum material, the G-quantum material is excited by the blue light to emit the blue light and a green light toward the first structure.

7. The display cell structure of claim 6, wherein for each of the pixels,
   in the first half-frame, when the blue (B) color filter in the first sub-pixel receives the blue light and the red light emitted by the R-quantum material, the blue light propagates the blue (B) color filter;
   in the first half-frame, when the yellow (Y) color filter in the second sub-pixel receives the blue light and the red light emitted by the R-quantum material, the red light propagates the yellow (Y) color filter;
   in the second half-frame, when the blue (B) color filter in the first sub-pixel receives the blue light and the green light emitted by the G-quantum material, the blue light propagates the blue (B) color filter; and in the second half-frame, when the yellow (Y) color filter in the second sub-pixel receives the blue light and the green light emitted by the G-quantum material, the green light propagates the yellow (Y) color filter.

8. The display cell structure of claim 1, wherein the at least one first transparent electrode comprises a plurality of first strip-shaped electrodes, and the at least one second transparent electrodes correspondingly comprises a plurality of second strip-shaped electrodes, each of the first strip-shaped electrodes and each of the second strip-shaped electrodes extend along an extending direction, and the extending direction is a column direction or a row direction.

9. The display cell structure of claim 8, wherein each of the second strip-shaped electrodes has an identical width.

10. The display cell structure of claim 8, wherein the second strip-shaped electrodes have different widths, and a first width of one of the second strip-shaped electrodes located farther away from the blue light source is greater than a second width of another one the second strip-shaped electrodes located closer to the blue light source.

11. The display cell structure of claim 1, wherein one of the at least one first transparent electrode and the at least one second transparent electrode comprises a plurality of strip-shaped electrodes extending along an extending direction, the extending direction is a column direction or a row direction, and the other of the at least one first transparent electrode and the at least one second transparent electrode comprises a common electrode.

12. The display cell structure of claim 1, wherein the G-quantum materials and the R-quantum materials of the pixels are alternately disposed along a first direction such that each G-quantum material is adjacent to one of the R-quantum materials in the first direction, and the first direction is a row direction or a column direction.

13. The display cell structure of claim 1, wherein the G-quantum materials and the R-quantum materials of the pixels are alternately disposed along a row direction and a column direction to form a matrix, such that each G-quantum material is adjacent to one of the R-quantum materials in the row direction and in the column direction.

14. The display cell structure of claim 8, wherein each of the first strip-shaped electrodes and the second strip-shaped electrodes has two long sides, and the blue light source is disposed at a side of the second structure parallel to the long sides of each of the first strip-shaped electrodes.

15. The display cell structure of claim 14, wherein the blue light source comprises a first blue light source and a second blue light source, respectively disposed at two opposite sides of the second structure parallel to the two long sides of each of the first strip-shaped electrodes.

16. A display method, comprising:
providing a display cell structure of claim 1;
in the first half-frame, providing the voltage difference to the first transparent electrode and the second transparent electrode corresponding to each G-quantum material to form an electric field to control alignment of PNLC or PDLC molecules of the PNLC or PDLC layer corresponding to each G-quantum material, and providing no voltage difference to the first transparent electrode and the second transparent electrode corresponding to each R-quantum material, such that the PNLC or PDLC molecules aligned to the G-quantum material are configured to be turned on to switch to a transparent state, and the PNLC or PDLC molecules aligned to the R-quantum material are randomly arranged to scatter and diffuse the blue light emitted by the blue light source, such that the blue light is guided toward the R-quantum material; and in the second half-frame, providing the voltage difference to the first transparent electrode and the second transparent electrode corresponding to each R-quantum material to form an electric field to control alignment of the PNLC or PDLC molecules of the PNLC or PDLC layer corresponding to each R-quantum material, and providing no voltage difference to the first transparent electrode and the second transparent electrode corresponding to each G-quantum material, such that the PNLC or PDLC molecules aligned to the R-quantum material are configured to be turned on to switch to the transparent state, and the PNLC or PDLC molecules aligned to the G-quantum material are randomly arranged to scatter and diffuse the blue light emitted by the blue light source, such that the blue light is guided toward the G-quantum material.

17. The display method of claim 16, wherein for each of the pixels,
in the first half-frame, when the R-quantum material receives the blue light guided by the PNLC or PDLC molecules aligned to the R-quantum material, the R-quantum material is excited by the blue light to emit the blue light and a red light toward the first structure; and
in the second half-frame, when the G-quantum material receives the blue light guided by the PNLC or PDLC molecules aligned to the G-quantum material, the G-quantum material is excited by the blue light to emit the blue light and a green light toward the first structure.

18. The display method of claim 17, further comprising:
for each of the pixels, controlling alignment of liquid crystal molecules of the liquid crystal layer, such that the blue light and the red light emitted by the R-quantum material in the first half-frame and the blue light and the green light emitted by the G-quantum material in the second half-frame is allowed to pass through at least some of the pixels.

19. The display method of claim 18, wherein for each of the pixels,
in the first half-frame, when the blue (B) color filter in the first sub-pixel receives the blue light and the red light emitted by the R-quantum material, the blue light propagates the blue (B) color filter;
in the first half-frame, when the yellow (Y) color filter in the second sub-pixel receives the blue light and the red light emitted by the R-quantum material, the red light propagates the yellow (Y) color filter;
in the second half-frame, when the blue (B) color filter in the first sub-pixel receives the blue light and the green light emitted by the G-quantum material, the blue light propagates the blue (B) color filter; and
in the second half-frame, when the yellow (Y) color filter in the second sub-pixel receives the blue light and the green light emitted by the G-quantum material, the green light propagates the yellow (Y) color filter.

* * * * *